United States Patent
Kojima

(10) Patent No.: US 7,869,808 B2
(45) Date of Patent: Jan. 11, 2011

(54) WIRELESS COMMUNICATION SYSTEM

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 545 days.

(21) Appl. No.: 11/606,219

(22) Filed: Nov. 30, 2006

(65) Prior Publication Data

US 2008/0045217 A1    Feb. 21, 2008

(30) Foreign Application Priority Data

Aug. 18, 2006  (JP) .............................. 2006-223282

(51) Int. Cl.
*H04W 36/00* (2009.01)

(52) U.S. Cl. ...................... 455/437; 455/436; 455/438; 455/439; 455/440; 370/331

(58) Field of Classification Search ................. 455/431, 455/436–441; 370/331
See application file for complete search history.

(56) References Cited

U.S. PATENT DOCUMENTS

| | | |
|---|---|---|
| 2003/0125027 A1 | 7/2003 | Gwon |
| 2003/0185202 A1 | 10/2003 | Maenpaa |
| 2004/0136345 A1* | 7/2004 | Yano et al. ................. 370/335 |
| 2005/0147042 A1* | 7/2005 | Purnadi et al. ............. 370/236 |
| 2005/0227693 A1* | 10/2005 | Kong et al. ................. 455/436 |

OTHER PUBLICATIONS

Extended European Search Report dated Jul. 2, 2010 received in corresponding European Patent Appln. No. 06125154.2-2412/1890511.
K. El Malki: "Low Latency Handoffs in Mobile IPv4" Oct. 3, 2005, pp. 1-56, XP002580103 Retrieved from the Internet : URL: http : // tools.ietf.org/id/draft-ietf-mobileip-lowlatency-handoffs-v4-11.txt pp. 9-37, paragraph 3-6.

* cited by examiner

*Primary Examiner*—Huy Phan
*Assistant Examiner*—Munsoon Choo
(74) *Attorney, Agent, or Firm*—Hanify & King, P.C.

(57) ABSTRACT

A wireless communication system which enables fast handovers by eliminating a time lag that occurs during handover process. A new base station recognizes lower layer link switching timing of a mobile station, then adjusts the output timing of a packet transmission initiation message, which triggers packet transmission, so that when a packet is transmitted from a new relay device to the mobile station, the packet may arrive at the mobile station immediately after the lower layer link switching, and sends out the packet transmission initiation message at the adjusted output timing to the new relay device. On receiving the packet transmission initiation message, the new relay device transmits the packet to the mobile station. The mobile station executes the lower layer link switching to complete lower layer handover, and then completes upper layer handover on receiving the packet from the new relay device immediately after the link switching.

8 Claims, 16 Drawing Sheets

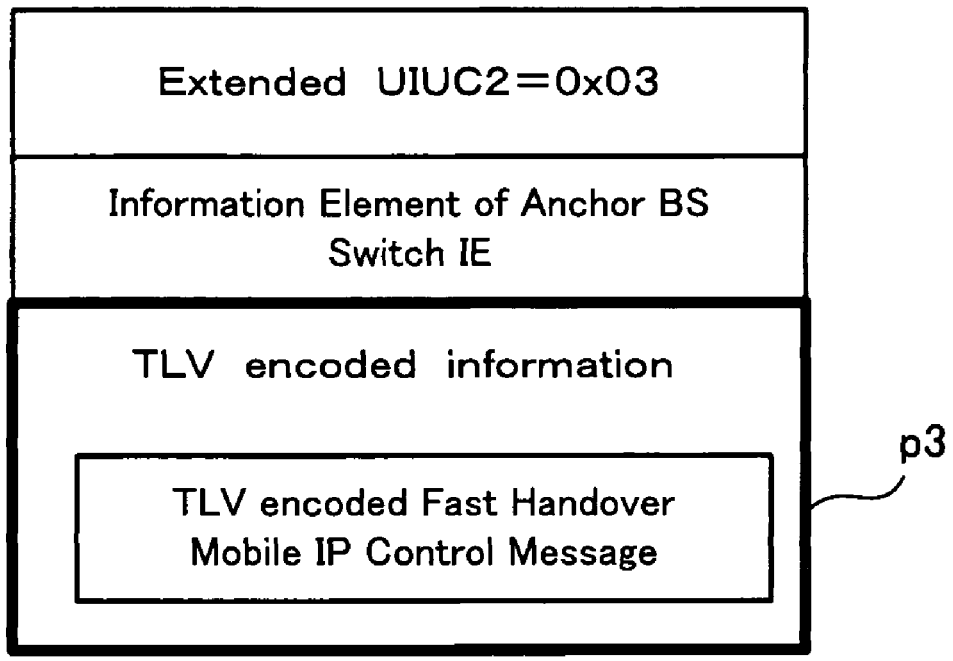
 : Newly Added Part
FIG. 12

WIRELESS COMMUNICATION SYSTEM

CROSS-REFERENCE TO RELATED APPLICATIONS

This application is based upon and claims the benefits of priority from the prior Japanese Patent Application No. 2006-223282 filed on Aug. 18, 2006, the entire contents of which are incorporated herein by reference.

BACKGROUND OF THE INVENTION

1. Field of the Invention

The present invention relates to wireless communication systems, and more particularly, to a wireless communication system for carrying out wireless communication while executing handovers.

2. Description of the Related Art

A wireless communication scheme called WiMAX (Worldwide Interoperability for Microwave Access) is being standardized by the IEEE (Institute of Electrical and Electronics Engineers). While conventional wireless LAN is primarily aimed for indoor use, WiMAX is a wireless communication standard adapted for a wider area such as a metropolitan area.

In order to enable fast handovers, WiMAX provides a function called FBSS (Fast Base Station Switching). With FBSS, each mobile station (MS) holds a Diversity Set identifying a plurality of base stations (BSs) of which the radio wave strengths in terms of C/I (CINR: Carrier-to-Interference plus Noise Ratio) are of a satisfactory level higher than a certain value, and previously establishes packet-based synchronization with each of the base stations included in the Diversity Set, to carry out a handover at high speed when necessary.

FIG. 13 illustrates a network wherein handover is executed according to FBSS. A WiMAX network 100 comprises a gateway 101 (GW), base stations 102 to 104 (BS1 to BS3), and a mobile station 105 (MS). The mobile station and the base stations have timers synchronized with one another and are capable of referring to the identical time.

Let us suppose here that the mobile station holds a Diversity Set identifying BS1, BS2 and BS3, and that before movement, the mobile station is exchanging packets with BS1 as an Anchor BS (the base station with which the mobile station is actually communicating, among those included in the Diversity Set).

S71: The mobile station exchanges packets with BS1, which is the Anchor BS and is included in the Diversity Set.

S71a: The mobile station previously establishes packet-based synchronization not only with BS1 but also with BS2 and BS3 included in the Diversity Set.

S72: The mobile station moves to the area of BS2.

S73: The mobile station and BS2, between which packets are to be exchanged after a handover, determine in advance the time for switching over to BS2, and the switching from BS1 to BS2 is executed exactly at the determined time to carry out the handover.

S74: BS2 acts as a new Anchor BS and communication is performed between the mobile station and BS2.

The FBSS operation described above is executed at the WiMAX layer (corresponding to Layer 2) and is standardized; however, nothing is stipulated as to the connectivity of the IP (Internet Protocol) layer higher in level than the WiMAX layer.

Meanwhile, Mobile IP (RFC 3344) is known as a scheme for implementing IP Mobility (technique whereby, even after the movement of a mobile station, IP packets can be exchanged by using the same IP address).

Predictive type fast handover Mobile IP is a scheme based on Mobile IP and enabling faster handovers, and Fast Handovers for Mobile IPv6 (RFC 4068: FMIPv6) and Mobile IPv4 Fast Handovers (draft-ietf-mip4-fmipv4-00.txt; in process of standardization; FMIPv4) are known as such scheme.

According to Predictive type fast handover Mobile IP, a mobile station acquires in advance information about an L3 (Layer 3) network (corresponding to IP) as the target of handover. During an L2 (Layer 2) handover, packets are forwarded to and buffered in the router of the target network.

On completion of the L2 handover, the mobile station transmits a packet transfer initiation message to the target network, whereupon the target network starts to transmit the packets to the mobile station, so that the mobile station is handed over at high speed without the need for L3 re-establishment.

The L3 re-establishment is unnecessary because the mobile station previously acquires information about the target L3 network. The L2 in the Predictive type fast handover Mobile IP corresponds to the aforementioned WiMAX layer.

As conventional techniques for controlling handovers among mobile and base stations, a technique has been proposed in which the mobile station measures a packet timing difference and sends the measured difference to the base station, and the base station corrects the phase of packets involving the timing difference, so as to establish synchronization at the time of handover (e.g., Unexamined Japanese Patent Publication No. 2000-69526 (paragraph nos. [0046] to [0051], FIG. 1)).

In WiMAX wireless networks, handovers at both Layers 2 and 3 can be executed by combining an FBSS-based fast handover scheme with a fast handover scheme used in Mobile IP, such as FMIPv6.

FIG. 14 shows a wireless network wherein FBSS and FMIPv6 are combined to carry out handovers. The wireless network 200 comprises a core network 210, access networks 220 and 230, and a mobile station 240 (MS).

The core network 210 includes a correspondent node 211 (CN) and a home agent 212 (HA). The access network 220 includes a previous access router 221 (PAR), a base station 222 (BS1), and a previous base station 223 (PBS). The access network 230 includes a new access router 231 (NAR), a base station 233 (BS2), and a new base station 232 (NBS).

The "previous base station" and the "new base station" are so termed because they act as such with respect to the mobile station, and each base station can function as both the previous and new base stations.

Also, the naming of the individual devices on the wireless network 200 follows the terminology according to the standard specification RFC 4068 for FMIPv6 (the terminology is basically identical with that of FMIPv4), where PBS/NBS corresponds to BS in WiMAX and PAR/NAR corresponds to GW in WiMAX.

When moving from the access network 220 to the access network 230, the mobile station makes a switching from PBS to NBS in the Diversity Set (Anchor BS is switched from PBS to NBS). With the movement of the mobile station, the route of exchanging packets changes as r1→r2→r3.

FIGS. 15 and 16 are sequence diagrams illustrating a handover executed in the wireless network 200, wherein Steps S82 through S86 are a preparatory process and Steps S87 through S97 are a handover process. Also, in the figures, WiMAX control messages for FBSS are enclosed in solid-line rectangles, and FMIPv6 control messages are enclosed in dashed-line rectangles.

S81: Packets delivered from the home agent are forwarded to the mobile station via the PAR and the PBS.

S82: MOB_MSHO_REQ (NBS) is a Diversity Set recommended BS request message. The mobile station sends this message to the PBS to inquire whether the NBS may be added to the Diversity Set.

S83: MOB_BSHO_RSP (NBS) is a Diversity Set recommended BS response message. Using this message, the PBS notifies the mobile station that the NBS can be added to the Diversity Set. By exchanging messages in Steps S82 and S83, the mobile station and the PBS negotiate a base station that can be added to the Diversity Set.

S84: MOB_HO_IND (NBS) is a Diversity Set update message. By means of this message, the mobile station finally decides the base station to be added to the Diversity Set, and then updates the Diversity Set.

S85, S86: RtSolPr (Router Solicitation for Proxy Advertisement) is an L3 network information request message, and PrRtAdv (Proxy Router Advertisement) is an L3 network information advertisement message. The mobile station sends RtSolPr to the PAR, and the PAR returns PrRtAdv to the mobile station.

Specifically, after the update of the Diversity Set is completed, L3 network information (network prefix, router IP address, CoA (Care of Address), etc.) about the new access router (AR) to which the base station added to the Diversity Set belongs is acquired by means of RtSolPr and PrRtAdv.

S87: FBU (Fast Binding Update) is an L3 network handover initiation message. By means of the FBU message, the mobile station notifies the PAR of the initiation of a handover, namely, that the mobile station is moving to the network of the NAR.

S88, S89: HI (Handover Initiate) is an inter-L3 router handover initiation message, and HAck (Handover Acknowledge) is an inter-L3 router handover response message. The PAR sends the HI message to the NAR to notify same that the handover is to be executed, and the NAR returns the HAck message by way of a response.

S90, S91: After the handover initiation messages are exchanged between the routers, the PAR stops transmitting packets to the mobile station and forwards, to the NAR, the packets to be transmitted to the mobile station, so that the packets are buffered in the NAR.

S92: FBack (Fast Binding Acknowledgement) is an L3 network handover response message, which is responsive to the message received in Step S87.

S93: MOB_HO_IND (NBS) is an L2 handover initiation message. Although the name of this message is identical with that of the message sent in Step S84, the PBS can distinguish between the two messages because the parameters included therein are different. On sending out this WiMAX control message, the mobile station switches the Anchor BS from the PBS to the NBS.

S94: Anchor_BS_Switch_IE is an L2 switching time designation message. This message notifies the mobile station of the designated timing for carrying out L2 switching.

S95: The mobile station carries out L2 link switching at the designated timing.

S96: FNA (Fast Neighbor Advertisement) is an L3 packet transmission initiation message. Since the L2 connection is completed in Step S95, the FNA message is sent to the NAR to instruct same to establish L3 connection. The FNA message signifies that the handover at L2 is completed and also that transmission of packets from the NAR to the mobile station should be started.

S97: On receiving the FNA message, the NAR transmits the buffered packets to the mobile station via the NBS.

S98, S99: BU (Binding Update) is an L3 packet route switching message. When this message is received, the home agent switches the target of packet transfer from the PAR to the NAR (the Anchor router is switched from the PAR to the NAR).

During the aforementioned process, packets (actual traffic packet data exchanged between the home agent and the mobile station) flow in the manner described below. From Step S81 to Step S89, packets flow via the route r1 shown in FIG. 14, from Step S90 to Step S98, packets flow via the route r2, and after Step S99, packets flow via the route r3.

In the handover process involving two layers, the link of the upper Layer 3 (FMIPv6) and then the link of the lower Layer 2 (WiMAX) are disconnected in order. When establishing links, on the other hand, the Layer 2 link and then the Layer 3 link are established in order.

The control flow described above permits the handover process involving two layers to be carried out using the combination of FBSS and FMIPv6. However, the handover process is associated with the problems explained below.

First, there occurs a time lag between the L2 switching in Step S95 and the arrival of packets at the mobile station. As soon as the L2 switching is performed, the mobile station is ready to receive packets. According to the above control flow, however, after the L2 switching, the mobile station sends an FNA message requesting packet transmission, and on receiving the message, the NAR forwards the packets to the mobile station. Consequently, a time lag occurs between the L2 switching and the packet reception, and this hinders speeding up the handover process.

Further, in the case of the handover involving two layers, Layer 2 control messages and Layer 3 control messages are exchanged separately, giving rise to a problem of increased traffic and consequent low efficiency.

Specifically, as seen from Steps S82 to S86, the control messages for FMIPv6 and the WiMAX control messages for FBSS are exchanged separately, and therefore, the number of times the messages are exchanged (the number of messages exchanged) is large, requiring extra time for the handover.

The handover preparatory process has no direct connection with the time required for the handover process itself. In FBSS, however, the Diversity Set is updated during the preparatory process, and the base stations registered in the Diversity Set are switched thereafter. Accordingly, if the update of the Diversity Set is delayed in the preparatory process, the initiation of the handover process is also delayed.

SUMMARY OF THE INVENTION

The present invention was created in view of the above circumstances, and an object thereof is to provide a wireless communication system which enables fast handovers by eliminating a time lag that occurs during handover process and also by reducing the number of messages exchanged.

To achieve the object, there is provided a wireless communication system for carrying out wireless communication while executing handovers. The wireless communication system comprises a mobile station, a previous base station communicating with the mobile station before a handover is executed, a new base station for communicating with the mobile station after the execution of the handover, a new relay device connected with the new base station for relaying packets after the execution of the handover, and a previous relay device connected with the previous base station for relaying packets before the execution of the handover. The mobile station and the previous base station synchronize link switching timing for a lower layer handover with each other, and the previous base station notifies the mobile station and the new base station of the link switching timing. When notified of the lower layer link switching timing of the mobile station, the new base station adjusts output timing of a packet transmission initiation message, which triggers packet transmission, so that when a packet is transmitted from the new relay device to the mobile station via the new base station, the packet may arrive at the mobile station immediately after the lower layer link switching, and sends out the packet transmission initiation message at the adjusted output timing to the new relay device. When the packet transmission initiation message is received, the new relay device transmits the packet to the mobile station via the new base station. The mobile station executes the lower layer link switching to complete the lower layer handover, and then completes an upper layer handover on receiving the packet from the new relay device immediately after the link switching, to start communication with the new base station while eliminating a time difference between a time of completion of the lower layer handover and a time of completion of the upper layer handover.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 shows another control message format.

DESCRIPTION OF THE PREFERRED EMBODIMENTS

Figure 1:
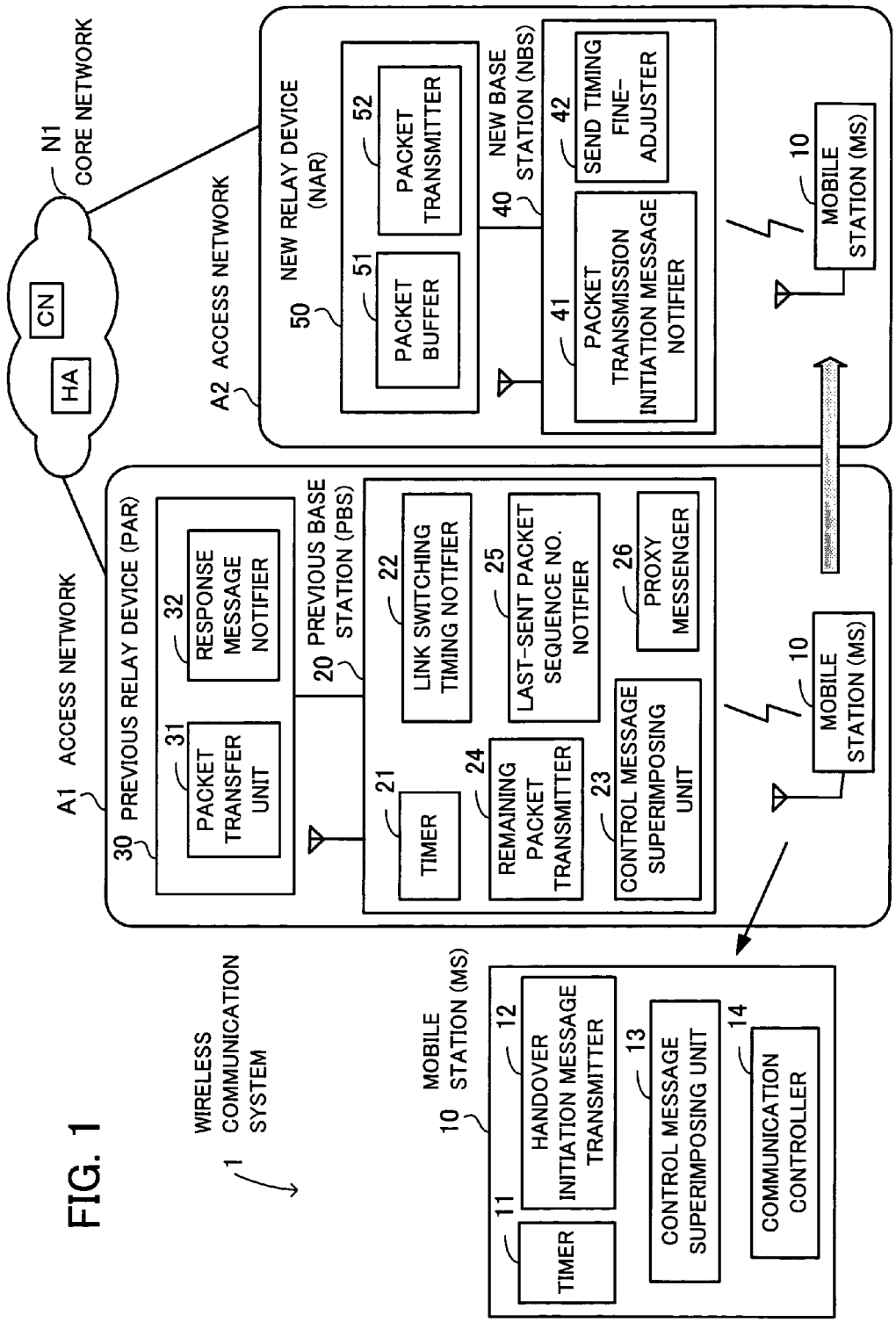
FIG. 1 illustrates the principle of a wireless communication system.

Preferred embodiments of the present invention will be described below with reference to the accompanying drawings, wherein like reference numerals refer to like elements throughout. FIG. 1 illustrates the principle of a wireless communication system. The wireless communication system 1 has a core network N1 and access networks A1 and A2 and, when a mobile station 10 moves from the access network A1 to the access network A2, for example, carries out a handover to enable the mobile station to continue wireless communication.

The handover executed in the wireless communication system 1 is a combination (upper/lower layer handover) of an upper layer handover, which is a handover at an upper layer, and a lower layer handover, which is a handover at a lower layer.

The core network N1 includes a correspondent node (CN) and a home agent (HA). The access network A1 includes a previous base station 20 and a previous relay device 30, and the access network A2 includes a new base station 40 and a new relay device 50.

The mobile station 10 comprises a mobile station-side timer 11, a handover initiation message transmitter 12, a control message superimposing unit 13, and a communication controller 14. The previous base station 20 comprises a base station-side timer 21, a link switching timing notifier 22, a control message superimposing unit 23, a remaining packet transmitter 24, a last-sent packet sequence number notifier 25, and a proxy messenger 26.

The new base station 40 includes a packet transmission initiation message notifier 41 and a send timing fine-adjuster 42. The previous relay device 30 comprises a packet transfer unit 31 and a response message notifier 32, and the new relay device 50 comprises a packet buffer 51 and a packet transmitter 52.

Figure 14:
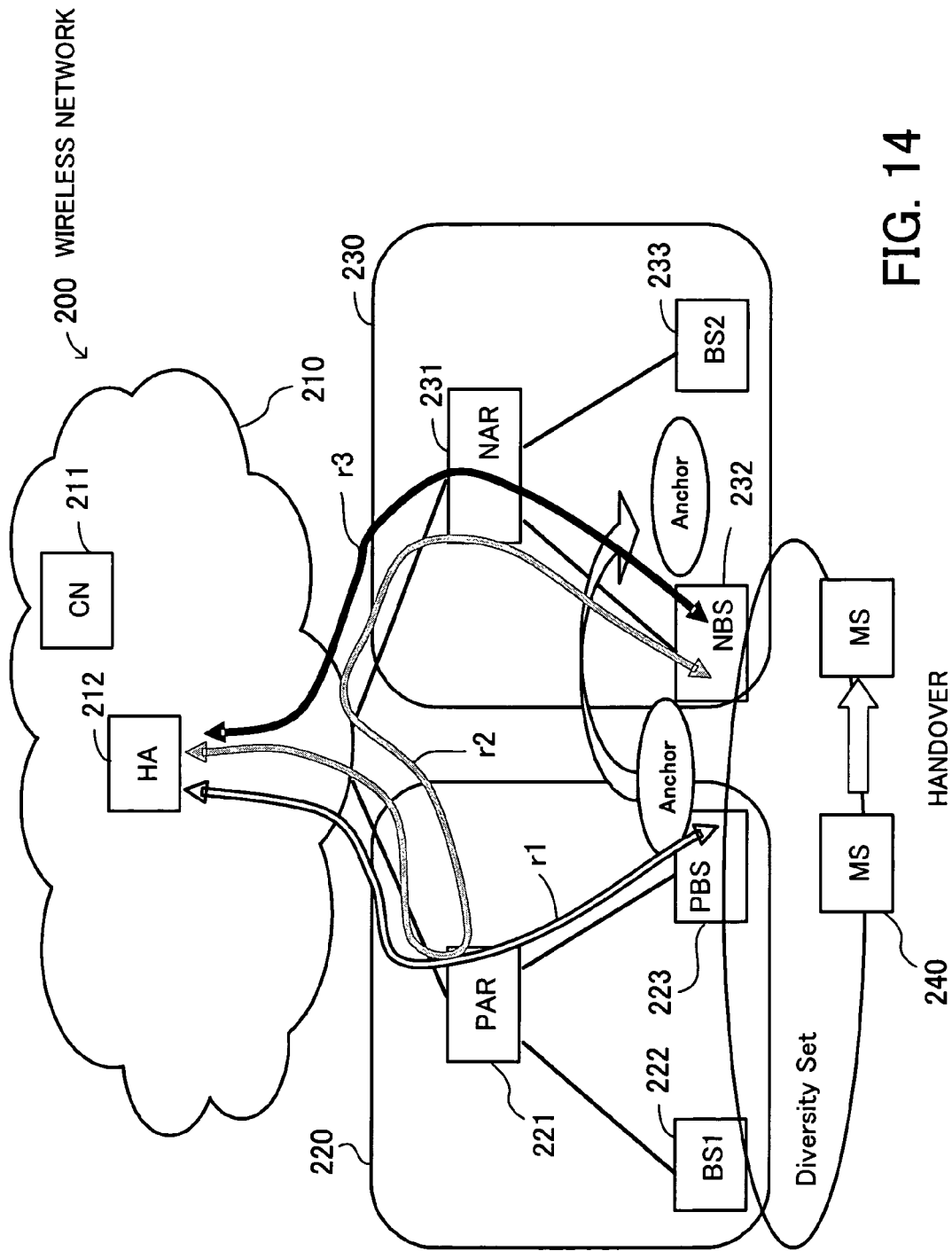
FIG. 14 shows a network wherein FBSS and FMIPv6 are combined to execute handover.
Figure 15:
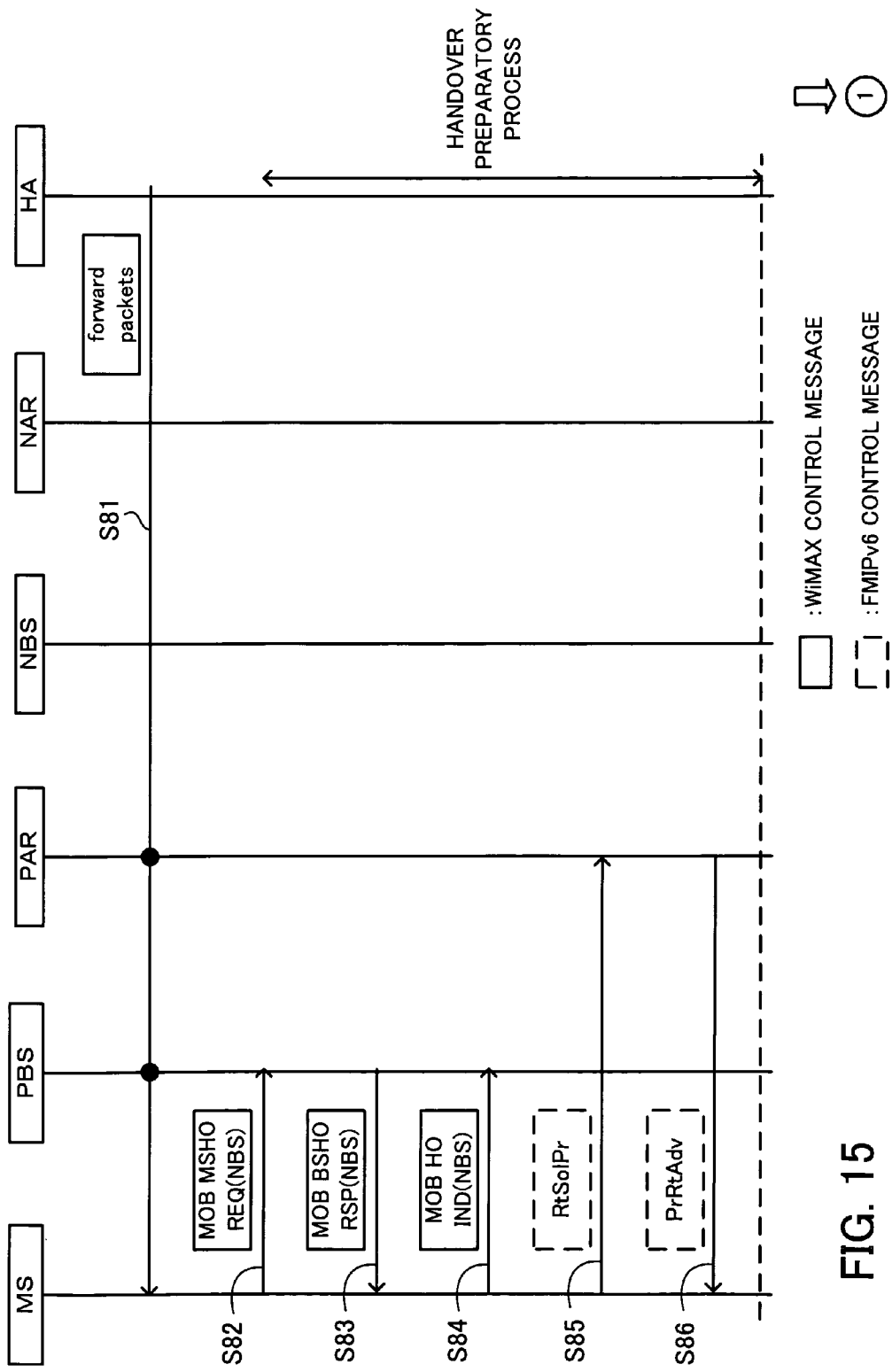
FIG. 15 is a sequence diagram illustrating a handover executed in the wireless network.
Figure 16:
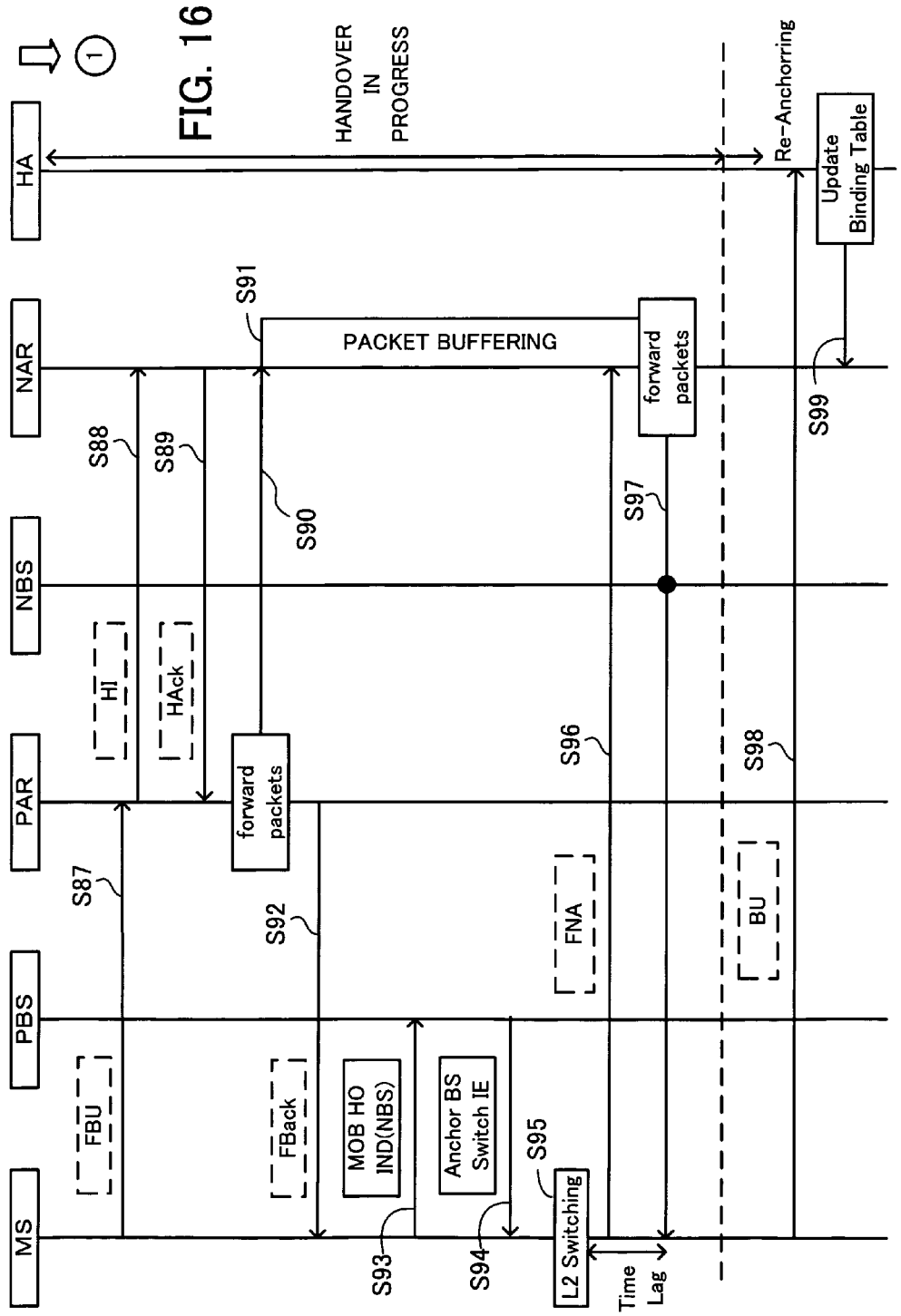
FIG. 16 is a sequence diagram also illustrating the handover executed in the wireless network.

The mobile station-side timer 11 sets lower layer link switching timing for executing a lower layer handover, which is a handover at the lower layer level. The base station-side timer 21 sets the link switching timing in a manner synchronized with the mobile station-side timer 11. Operations of the other elements will be explained later with reference to FIG. 2 and the following drawings. The mobile station 10, previous base station 20, new base station 40, previous relay device 30 and new relay device 50 correspond, respectively, to the MS, PBS, NBS, PAR, and NAR appearing in FIG. 14.

Figure 2:
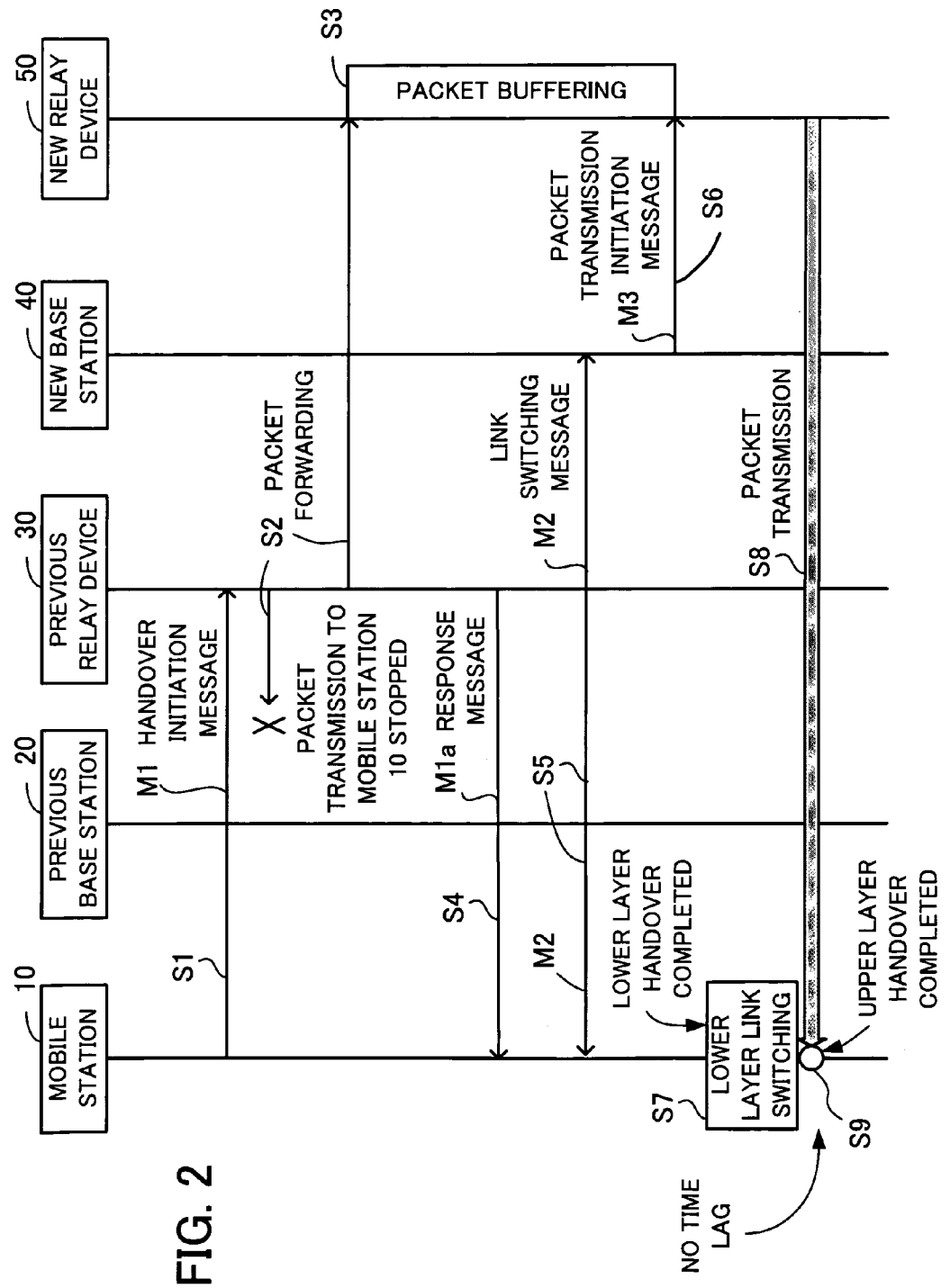
FIG. 2 is a sequence diagram illustrating an outline of operation of the wireless communication system.

Operation of the wireless communication system 1 will be now outlined with reference to the sequence diagram of FIG. 2.

S1: On completion of a handover preparatory process which is executed among the mobile station 10, the previous base station 20 and the previous relay device 30 prior to the upper/lower layer handover, the handover initiation message transmitter 12 transmits a handover initiation message M1 to the previous relay device 30.

S2: Before the upper/lower layer handover is executed, the packet transfer unit 31 of the previous relay device 30 transmits packets to the mobile station 10 via the previous base station 20. However, on receiving the handover initiation message M1, the packet transfer unit stops transmitting packets to the mobile station 10 and forwards the packets to the new relay device 50 instead.

S3: The packet buffer 51 of the new relay device 50 buffers the packets received from the previous relay device 30.

S4: upon start of the transfer of packets from the previous relay device 30 to the new relay device 50, the response message notifier 32 of the previous relay device 30 transmits a response message M1a, which is a response to the handover initiation message M1, to the mobile station 10 via the previous base station 20.

S5: When the response message M1a is received, the link switching timing notifier 22 of the previous base station 20 transmits, to the mobile station 10 and the new base station 40, a link switching message M2 including information about the link switching timing set in the base station-side timer 21.

The link switching message M2 and the response message M1a may alternatively be sent as an identical message to the mobile station 10 from the response message notifier 32 or the link switching timing notifier 22.

S6: On receiving the link switching message M2, the packet transmission initiation message notifier 41 of the new base station 40 recognizes the lower layer link switching timing of the mobile station 10, then adjusts the output timing of a packet transmission initiation message M3, which triggers packet transmission, so that when packets are transmitted from the new relay device 50 to the mobile station 10 via the new base station 40, the arrival of packets at the mobile station 10 may take place immediately after the lower layer link switching (immediately after the completion of the lower layer handover), and sends out the packet transmission initiation message M3 at the adjusted output timing to the new relay device 50.

S7: When the link switching message M2 is received, the communication controller 14 of the mobile station 10 sets the link switching timing in the mobile station-side timer 11 and, when the timer value reaches the link switching timing, carries out lower layer link switching to complete lower layer handover.

S8: On receiving the packet transmission initiation message M3, the packet transmitter 52 of the new relay device 50 starts to transmit the buffered packets to the mobile station 10 via the new base station 40.

S9: The communication controller 14 of the mobile station 10 receives the packets from the packet transmitter 52 immediately after the link switching, whereupon upper layer handover is completed. Accordingly, the upper/lower layer handover is completed while eliminating a time difference (time lag) between the time of completion of the lower layer handover and the time of completion of the upper layer handover, and communication with the new base station 40 is started immediately thereafter.

Thus, in the wireless communication system 1, the new base station 40, to which the mobile station 10 is to be newly connected, recognizes the lower layer link switching timing of the mobile station 10, then adjusts the output timing of the packet transmission initiation message M3, which triggers packet transmission, so that when packets are transmitted from the new relay device 50 to the mobile station 10 via the new base station 40, the packets may arrive at the mobile station 10 immediately after the lower layer link switching, and sends out the packet transmission initiation message M3 at the adjusted output timing to the new relay device 50.

On receiving the packet transmission initiation message M3, the new relay device 50 starts to transmit the packets to the mobile station 10, whereby the packets arrive at the mobile station 10 immediately after the lower layer link switching. Consequently, the time lag at the mobile station 10, which occurs during the handover process of the conventional system, does not occur, thus enabling fast handovers.

The following describes in detail the control action executed in the case where the wireless communication system 1 is adapted to perform a handover process based on the combination of the FBSS fast handover used in WiMAX and the FMIPv6 fast handover used in Mobile IP (the following explanation is directed to FMIPv6, because FMIPv4 and FMIPv6 are basically identical).

Also, in the sequence diagrams explained below, control messages enclosed in solid-line rectangles indicate WiMAX control messages (lower layer (L2) messages) for FBSS, and control messages enclosed in dashed-line rectangles indicate FMIPv6 control messages (upper layer (L3) messages).

Figure 3:
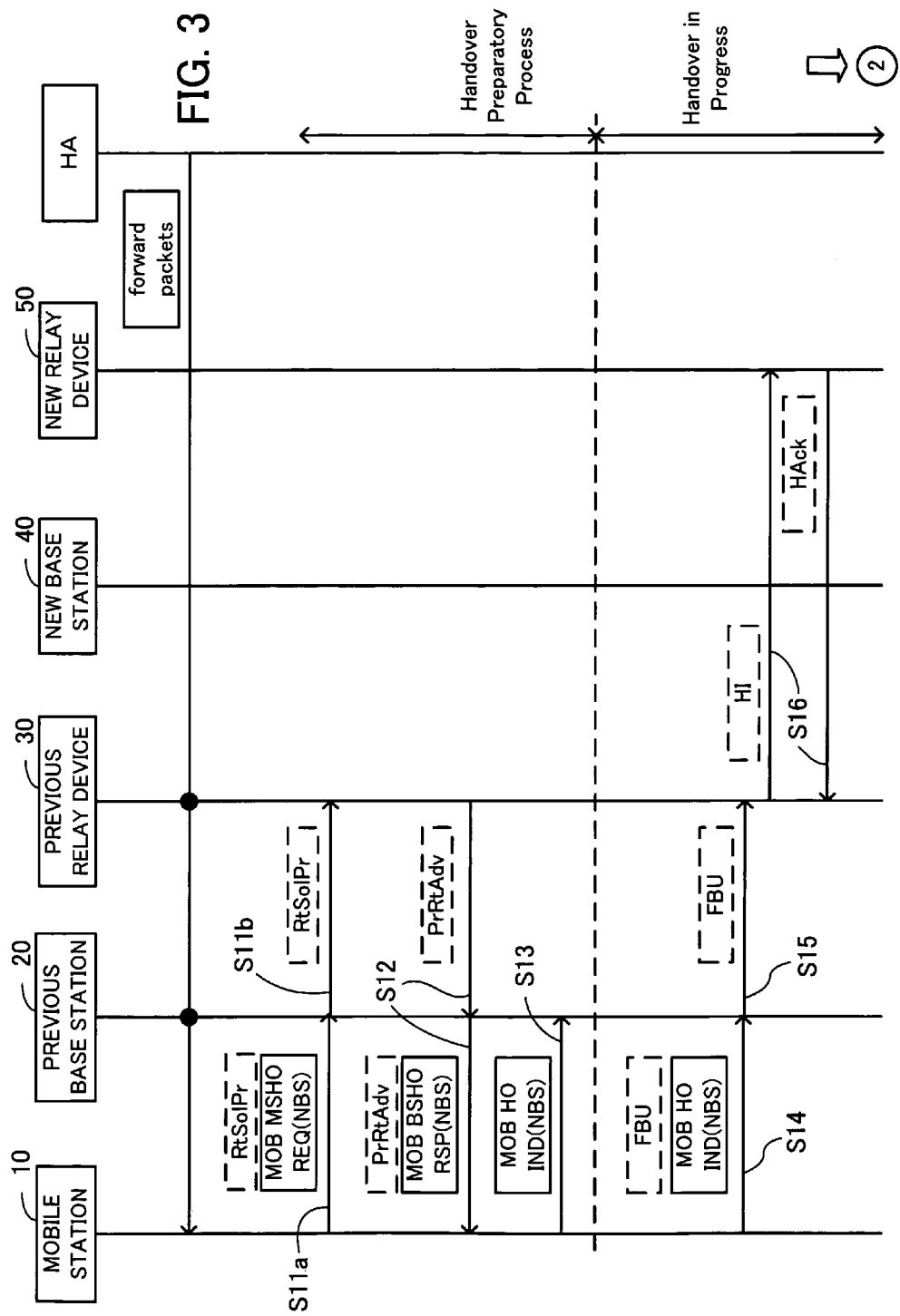
FIG. 3 is a sequence diagram illustrating a detailed operation of the wireless communication system.
Figure 4:
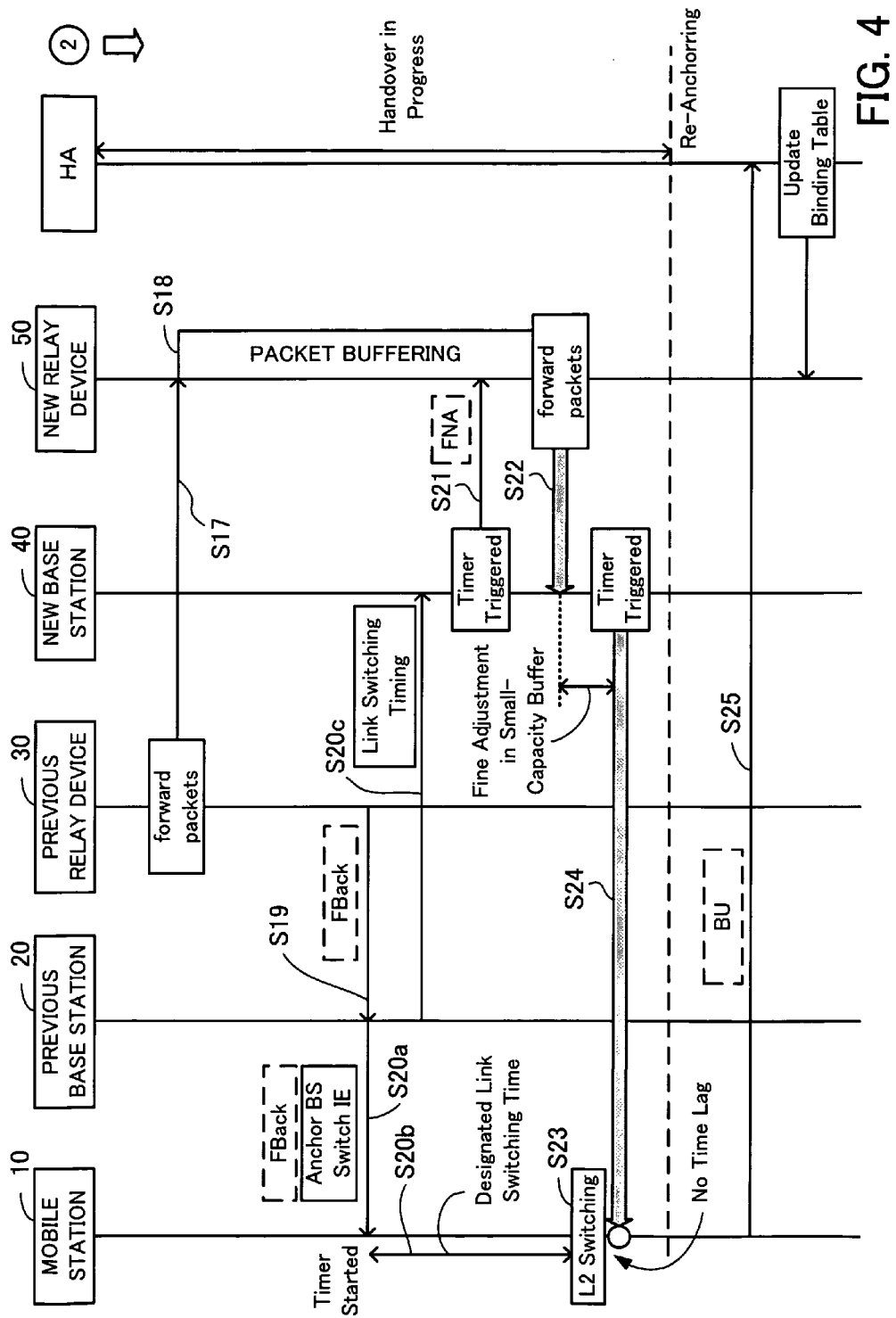
FIG. 4 is a sequence diagram also illustrating a detailed operation of the wireless communication system.

FIGS. 3 and 4 are sequence diagrams illustrating in detail an operation sequence according to a first embodiment, wherein the wireless communication system 1 is adapted to perform a handover process based on the combination of FBSS and FMIPv6. The system configuration of the network is identical with that shown in FIG. 1.

S11a: MOB_MSHO_REQ (NBS) is a Diversity Set recommended BS request message, and RtSolPr is an L3 network information request message. The control message superimposing unit 13 of the mobile station 10 superimposes MOB_MSHO_REQ (NBS), which is an L2 control message, and RtSolPr, which is an L3 control message, and transmits the superimposed message as an identical WiMAX packet. The superimposition of control messages will be explained later with reference to FIGS. 11 and 12.

S11b: On receiving the message sent in Step S11a, the previous base station 20 transfers only RtSolPr to the previous relay device 30, to request L3 network information about the network to which the base station (new base station 40) to be added to the Diversity Set by the mobile station 10 belongs.

S12: PrRtAdv is an L3 network information advertisement message. The previous base station 20 acquires the L3 network information from PrRtAdv. Also, the control message superimposing unit 23 of the previous base station 20 superimposes PrRtAdv and MOB_BSHO_RSP (NBS), which is a Diversity Set recommended BS response message, and transmits the superimposed message, as an identical WiMAX packet, to the mobile station 10. Consequently, the Diversity Set recommended BS response and the response to the L3 network information request can be sent at the same time.

S13: MOB_HO_IND (NBS) is a Diversity Set update message. By means of MOB_HO_IND (NBS), the mobile station 10 finally decides the base station (new base station 40) to be included in the Diversity Set and then updates the Diversity Set (this message need not be superimposed on an FMIPv6 control message).

S14: The mobile station 10 superimposes MOB_HO_IND (NBS) and FBU (corresponding to the handover initiation message M1 in FIG. 2), which is an L3 network handover initiation message, and transmits the superimposed message, as an identical WiMAX packet, to the previous base station 20.

S15: On receiving the message sent in Step S14, the previous base station 20 transfers only FBU to the previous relay device 30 to notify same of the L3 network handover.

S16: On receiving FBU, the previous relay device 30 transmits/receives HI/HAck (inter-L3 router handover initiation message/inter-L3 router handover response message) to/from the new relay device 50, thereby exchanging handover notification/response between L3 routers. The new base station 40, which is the target of handover of the mobile station 10, is specified in MOB_HO_IND, and accordingly, the previous relay device 30 can identify the new relay device 50 as the router to which the new base station belongs.

S17: After it is confirmed through the exchange of HI/HAck in Step S16 that the handover to the new relay device 50 is possible, the previous relay device 30 stops transmitting packets destined for the mobile station 10 to the previous base station 20, and forwards the packets to the new relay device 50 instead.

S18: The new relay device 50 starts to buffer the packets addressed to the mobile station 10.

S19: The previous relay device 30 transmits FBack (corresponding to the response message M1a in FIG. 2), which is an L3 network handover response message, to the previous base station 20 to notify same that a series of operations related with FBU, HI and HAck has been completed.

S20a: On receiving FBack, the previous base station 20 superimposes FBack and Anchor_BS_Switch_IE (corresponding to the link switching message M2 in FIG. 2), and transmits the superimposed message, as an identical WiMAX packet, to the mobile station 10. Anchor_BS_Switch_IE designates an L2 switching time, and thus, by superimposing this message and FBack, it is possible to carry out the L2 switching time designation and the L3 network handover response at the same time.

S20b: The mobile station 10 recognizes the link switching timing from Anchor_BS_Switch_IE, then sets the link switching timing in the mobile station-side timer 11, and starts the timer 11.

S20c: Simultaneously with the execution of Step S20a, the previous base station 20 also notifies the new base station 40 of the L2 switching timing (corresponding to the link switching message M2 in FIG. 2). The message used for this notification is not particularly stipulated by the standards and is transmitted by using a message format uniquely determined by the present invention.

S21: FNA is an L3 packet transmission initiation message (corresponding to the packet transmission initiation message M3 in FIG. 2). In the conventional system, the mobile station 10 transmits FNA to the new relay device 50, but according to the present invention, the new base station 40, instead of the mobile station 10, transmits FNA to the new relay device 50.

In this case, the new base station 40 adjusts the FNA output timing so that the packets may arrive at the mobile station 10 immediately after the lower layer link switching of the mobile station 10, and sends out FNA at the adjusted output timing to the new relay device 50.

To this end, the new base station 40 measures in advance a period of time needed from the reception of FNA by the new relay device 50 until the packets transmitted from the new relay device 50 arrive at the mobile station 10, inclusive of a propagation delay caused on the network. Based on the measurement result, the packet transmission initiation message notifier 41 in the new base station 40 outputs FNA (in the figures, "Timer Triggered" indicates that the output timing is adjusted). This makes it possible to complete the L3 handover taking into account the L2 switching of the mobile station 10.

S22: On receiving FNA, the new relay device 50 starts to transmit the buffered packets addressed to the mobile station 10.

S23: When the value of the mobile station-side timer 11 reaches the designated link switching time, the mobile station 10 executes the L2 switching.

S24: The new base station 40 relays the packets received from the new relay device 50 to the mobile station 10. The packet propagation time is measured beforehand in Step S21; however, because of error, the packets forwarded from the new relay device 50 may, possibly arrive at the new base station 40 slightly earlier than expected.

To cope with such a situation, the send timing fine-adjuster 42 of the new base station 40 finely adjusts the timing of sending out the packets from the new base station 40 to the mobile station 10. Specifically, the send timing fine-adjuster 42 is a small-capacity buffer which carries out short-time buffering of packets arriving early at the new base station 40, thereby delaying the packet transmission time and thus finely adjusting the send timing so that the packets may not reach the mobile station 10 before the link switching.

Thus, the small-capacity buffer for absorbing error is provided in the new base station 40, whereby the packet propagation time is adjusted with accuracy, enabling the packets to reach the mobile station 10 just after completion of the L2 switching.

Instead of using the small-capacity buffer as the send timing fine-adjuster 42, a propagation time slightly longer than the actual propagation time measured in advance may be set so as to finely adjust the send timing.

S25: The mobile station 10 transmits BU, which is an L3 packet route switching message, to the home agent. On receiving the message, the home agent switches the target of transfer of packets addressed to the mobile station 10 from the previous relay device 30 to the new relay device 50.

Thus, in the first embodiment, the handover control is executed in the aforementioned manner such that, instead of the mobile station, the base station synchronized with the mobile station transmits the L3 handover completion notification message (packet transmission initiation message M3) at timing set taking account of the L2 switching timing, thereby eliminating time lag and enabling faster handovers.

Also, the control message for FBSS and the control message for fast handover Mobile IP are superimposed to be transmitted/received as an identical WiMAX packet, whereby the number of messages exchanged can be reduced, enabling faster handovers.

A second embodiment will be now described, wherein the proxy messenger 26 provided in the previous base station 20 plays an important role. In cases where the mobile station 10 does not have the FMIP control function, the proxy messenger 26, in place of the mobile station 10, functions as Proxy FMIP for exchanging FMIPv6 control messages with the relay device.

Also, the proxy messenger 26 holds, in place of the mobile station 10, various information (FMIP Context) necessary for exchanging FMIPv6 control messages. The proxy messenger 26 is provided not only in the previous base station 20 but also in all base stations, including the new base station 40.

Figure 5:
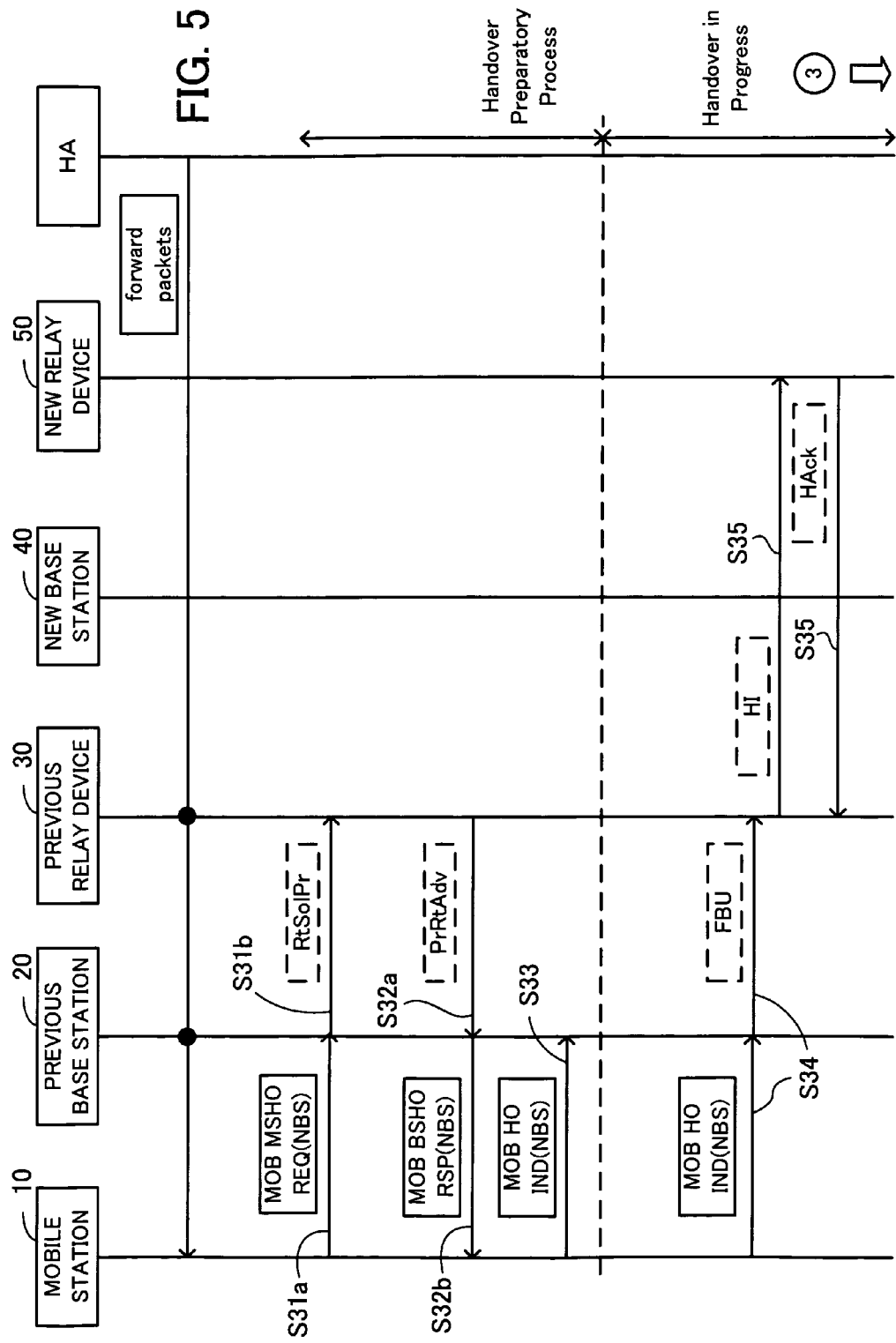
FIG. 5 is a sequence diagram illustrating an operation according to a second embodiment.
Figure 6:
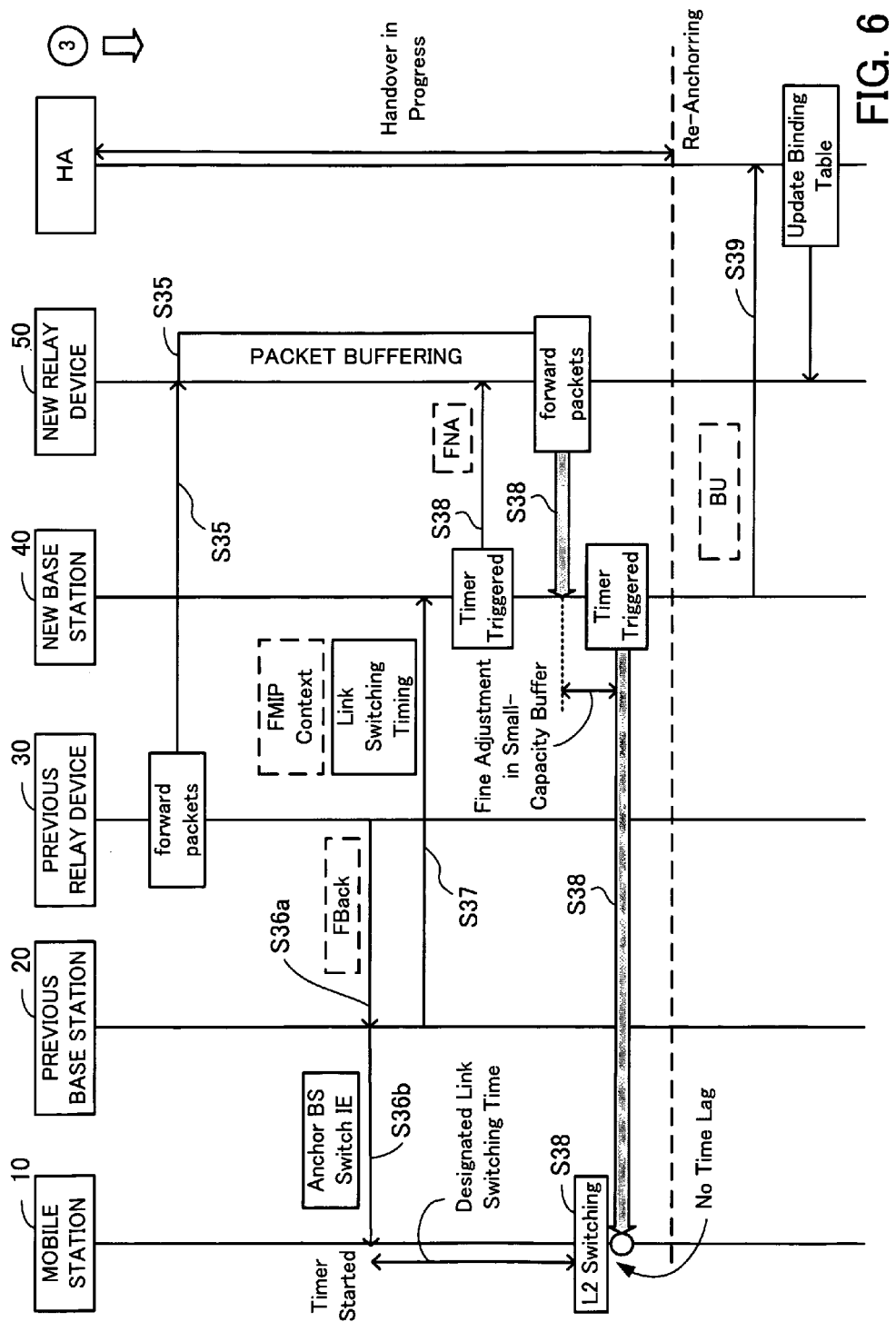
FIG. 6 is a sequence diagram also illustrating the operation according to the second embodiment.

FIGS. 5 and 6 are sequence diagrams illustrating operation according to the second embodiment.

S31a: The mobile station 10 transmits MOB_M-SHO_REQ (NBS) as a WiMAX packet.

S31b: In response to the reception of the message, the previous base station 20 (proxy messenger 26) transmits, in place of the mobile station 10, RtSolPr to the previous relay device 30, to request L3 network information about the network to which the base station to be added to the Diversity Set by the mobile station 10 belongs.

S32a: The previous relay device 30 transmits PrRtAdv to the previous base station 20, whereby the previous base station 20 acquires the L3 network information. The L3 network information is held as FMIP Context (the L3 network information is held not by the mobile station 10 but by the previous base station 20).

S32b: In response to the reception of the PrRtAdv message, the previous base station 20 (proxy messenger 26) transmits MOB_BSHO_RSP (NBS) to the mobile station 10.

S33: The mobile station 10 transmits MOB_HO_IND (NBS) to the previous base station 20, to notify same of the addition of the new base station 40 to the Diversity Set.

S34: The mobile station 10 transmits MOB_HO_IND (NBS) to the previous base station 20, and when this message is received, the proxy messenger 26 of the previous base station 20 transmits FBU, which is an L3 network handover initiation message, to the previous relay device 30.

S35: A process performed in this step is identical with that executed in Steps S16 to S18 of the first embodiment.

S36a: The previous relay device 30 transmits FBack to the previous base station 20, to notify same that a series of operations related with FBU, HI and HAck has been completed.

S36b: In response to the reception of FBack, the previous base station 20 transmits, as a WiMAX packet, Anchor_B-S_Switch_IE designating an L2 switching time to the mobile station 10.

Thus, although the L3 network-handover response is finally received not by the mobile station 10 but by the proxy messenger 26 of the previous base station 20, the L2 switching time designation and the L3 network handover response can be carried out at the same time, as in the first embodiment.

S37: The previous base station 20 notifies the new base station 40 of the L2 switching timing (link switching timing) and the FMIP Context. After the FMIP Context is transmitted to the new base station 40, the new base station 40 acts as the proxy messenger (Proxy FMIP).

S38: A process performed in this step is identical with that executed in Steps S21 to S24 of the first embodiment.

S39: In place of the mobile station 10, the proxy messenger in the new base station 40 transmits BU to the home agent. On receiving the message, the home agent switches the target of transfer of packets addressed to the mobile station 10 from the previous relay device 30 to the new relay device 50.

As explained above, in the second embodiment, each base station is provided with the proxy messenger. Accordingly, even if the mobile station does not support fast handover Mobile IP, the time lag at the mobile station can be eliminated, as in the first embodiment, and also the number of control messages exchanged can be reduced, thus enabling faster handovers.

Further, the bandwidth used for the wireless communication between the mobile station and the base station can be narrowed, compared with the first embodiment. Namely, since no fast handover Mobile IP control messages/data are exchanged between the mobile station and the base station, the bandwidth can be saved correspondingly.

Figure 7:
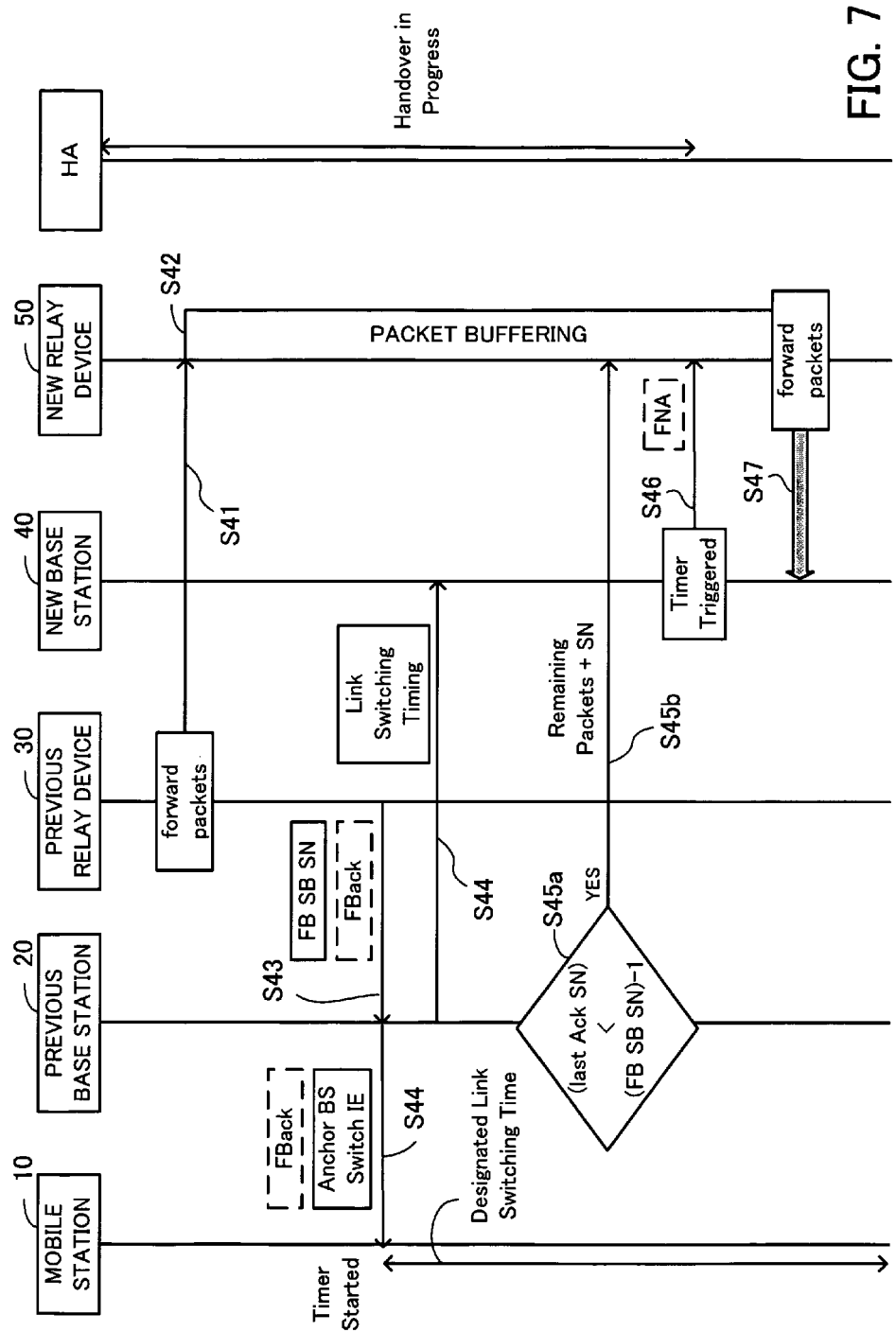
FIG. 7 is a sequence diagram illustrating an operation according to a third embodiment.
Figure 8:
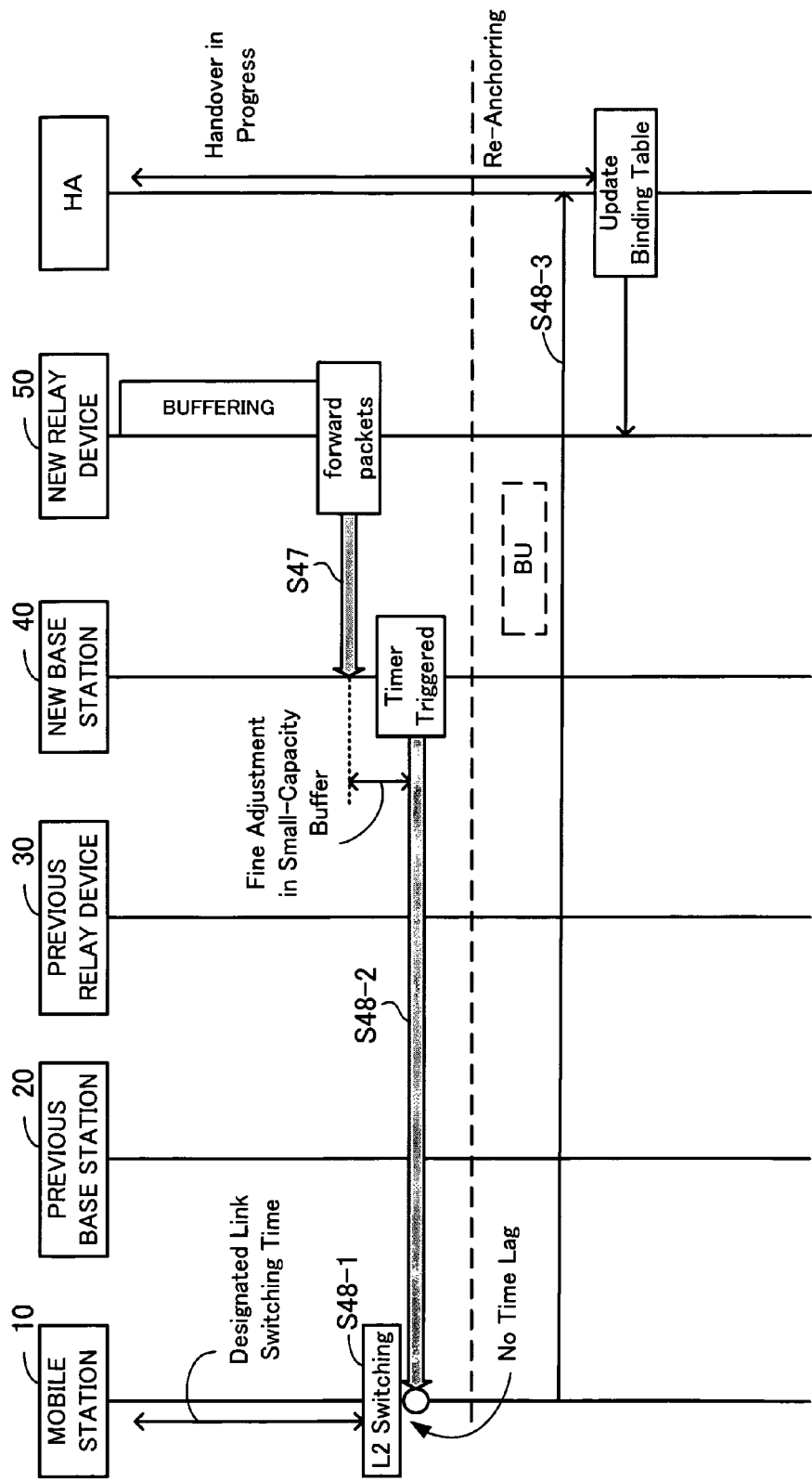
FIG. 8 is a sequence diagram also illustrating the operation according to the third embodiment.

A third embodiment will be now described with reference to the sequence diagrams of FIGS. 7 and 8 illustrating operation according to the third embodiment. Also in the third embodiment, Steps S11 to S16 of the first embodiment are executed, and accordingly, the following explanation is directed to the operation corresponding to Step S17 (transfer of packets from the previous relay device 30 to the new relay device 50) and the subsequent operations.

S41: When it is confirmed through the exchange of HI/HAck that the handover to the new relay device 50 is possible, the previous relay device 30 stops transmitting packets destined for the mobile station 10 to the previous base station 20, and forwards the packets to the new relay device 50 instead.

At this time, the previous relay device 30 assigns sequence numbers to the respective packets forwarded to the new relay device 50 (the packets transmitted to the previous base station 20 before the start of packet transfer to the new relay device 50 are also assigned respective sequence numbers by the previous relay device 30).

The previous relay device 30 stores the sequence number of the first packet which is forwarded first to the new relay device 50. The first packet is the packet which is buffered first in the new relay device 50, and therefore, the sequence number of the first packet is hereinafter referred to as the First Buffered Packet SN (in FIG. 7, indicated by FB SB SN).

S42: The new relay device 50 buffers the received packets.

S43: The previous relay device 30 transmits the First Buffered Packet SN, along with FBack, to the previous base station 20. The previous base station 20 stores the First Buffered Packet SN.

S44: A process performed in this step is identical with that executed in Steps S20a and S20c of the first embodiment.

S45a, S45b: If the sequence number (last Ack SN) of the last packet (last sent packet) which has been acknowledged last by the mobile station 10 is smaller than the value obtained by subtracting "1" from the First Buffered Packet SN, the remaining packet transmitter 24 in the previous base station 20 transmits the remaining packets remaining in the previous base station 20 to the new relay device 50 (packet buffer) along with the sequence numbers.

In the case where the relationship (last Ack SN)<(First Buffered Packet SN)−1 holds, it means that the previous base station 20 holds a remaining packet or packets that are not buffered in the new relay device 50. The previous base station 20 stops transmitting packets to the mobile station 10 at timing when the remaining packets are sent out in Step S45b. The timing for executing Step S45b is set based on the timing of L2 switching at Step S48-1 so as to spare sufficient time to execute Steps S46, S47 and S48-2.

S46: This step is identical with Step S21 of the first embodiment.

S47: The new relay device 50 also buffers the remaining packets transmitted thereto, refers to the sequence numbers assigned to the respective packets, and then transmits the packets to the new base station 40 in ascending order of sequence numbers.

S48-1 to S48-3: These steps are identical with Steps S23 to S25 of the first embodiment.

Referring now to a specific example, the above operation sequence will be explained. Let us suppose that when the link between the mobile station 10 and the previous base station 20 is disconnected, the previous base station 20 holds remaining packets with sequence numbers #4 to #7 that failed to be transmitted to the mobile station 10.

In this case, the sequence number (last Ack SN) of the last sent packet which was transmitted last from the previous base station 20 to the mobile station 10 is #3 (since the remaining packets #4 to #7 failed to be transmitted to the mobile station 10, the packets up to #3 have been transmitted to the mobile station 10). Also, the sequence number (First Buffered Packet SN) of the buffering start packet which was buffered first in the packet buffer 51 is #8 (since the remaining packets #4 to #7 failed to be transmitted to the mobile station 10 and the packet #8 and the succeeding packets have been forwarded to the new relay device 50, the packet received first by the packet buffer 51 is the packet #8).

Since last Ack SN=#3 and First Buffered Packet SN=#8, substituting the values for the relationship (last Ack SN)< (First Buffered Packet SN)−1 provides 3<8−1 (=7), thus fulfilling the inequality (i.e., the sequence number of the last sent packet is smaller than the value obtained by subtracting "1" from the sequence number of the buffering start packet which was buffered first in the packet buffer 51). Accordingly, the remaining packet transmitter 24 transmits the remaining packets, along with their sequence numbers #4 to #7, to the packet buffer 51 to be buffered therein, and the packet transmitter 52 transmits the packets to the mobile station 10 in order from the packet #4.

As explained above, in the third embodiment, the packets remaining in the previous base station 20, which were received before the start of buffering and are not yet transmitted to the mobile station 10, are sent to and buffered in the packet buffer 51. Thus, not only fast handover is available, as in the first embodiment, but also packet loss can be eliminated while at the same time preventing the reversal of the order of packets.

Figure 9:
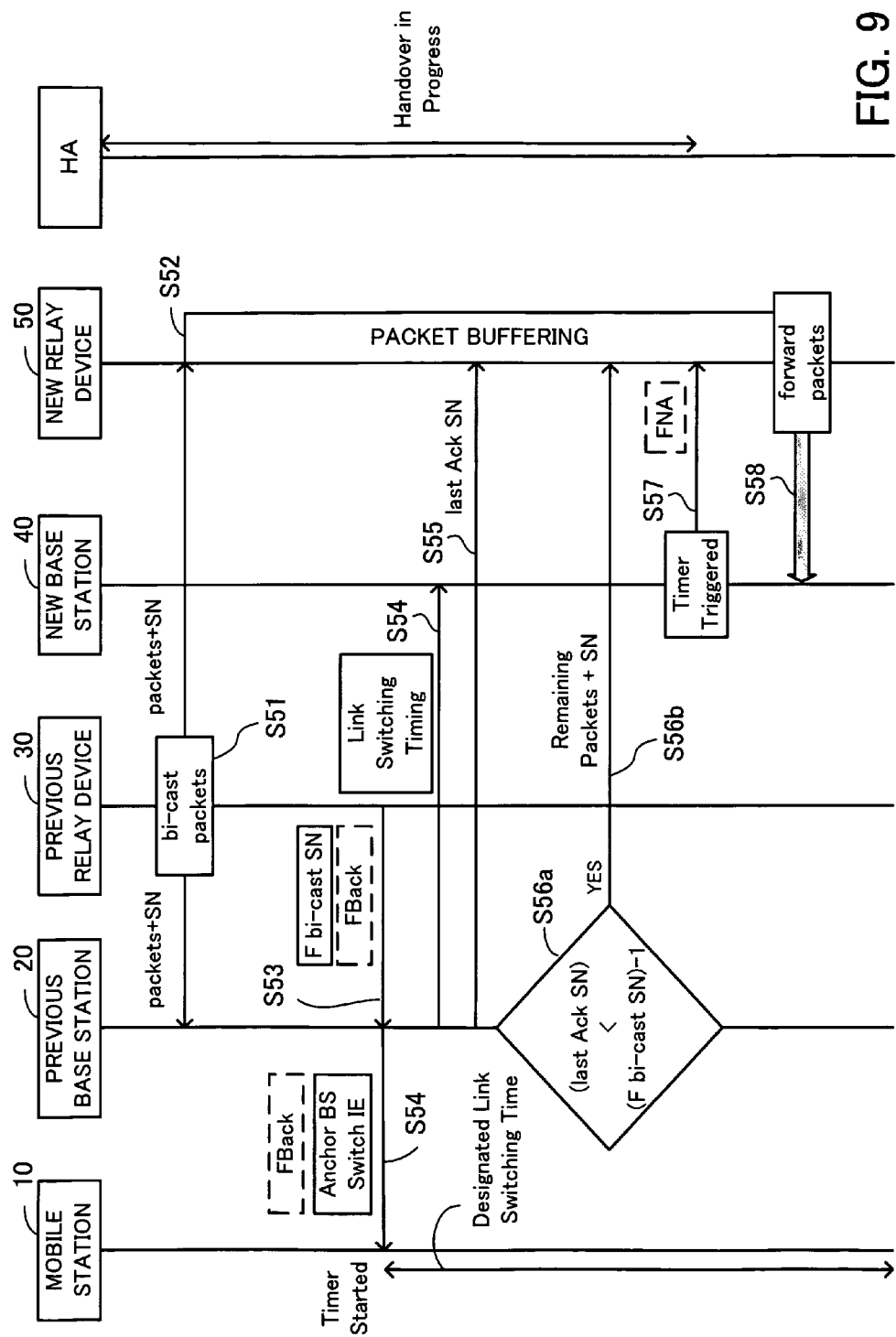
FIG. 9 is a sequence diagram illustrating an operation according to a fourth embodiment.
Figure 10:
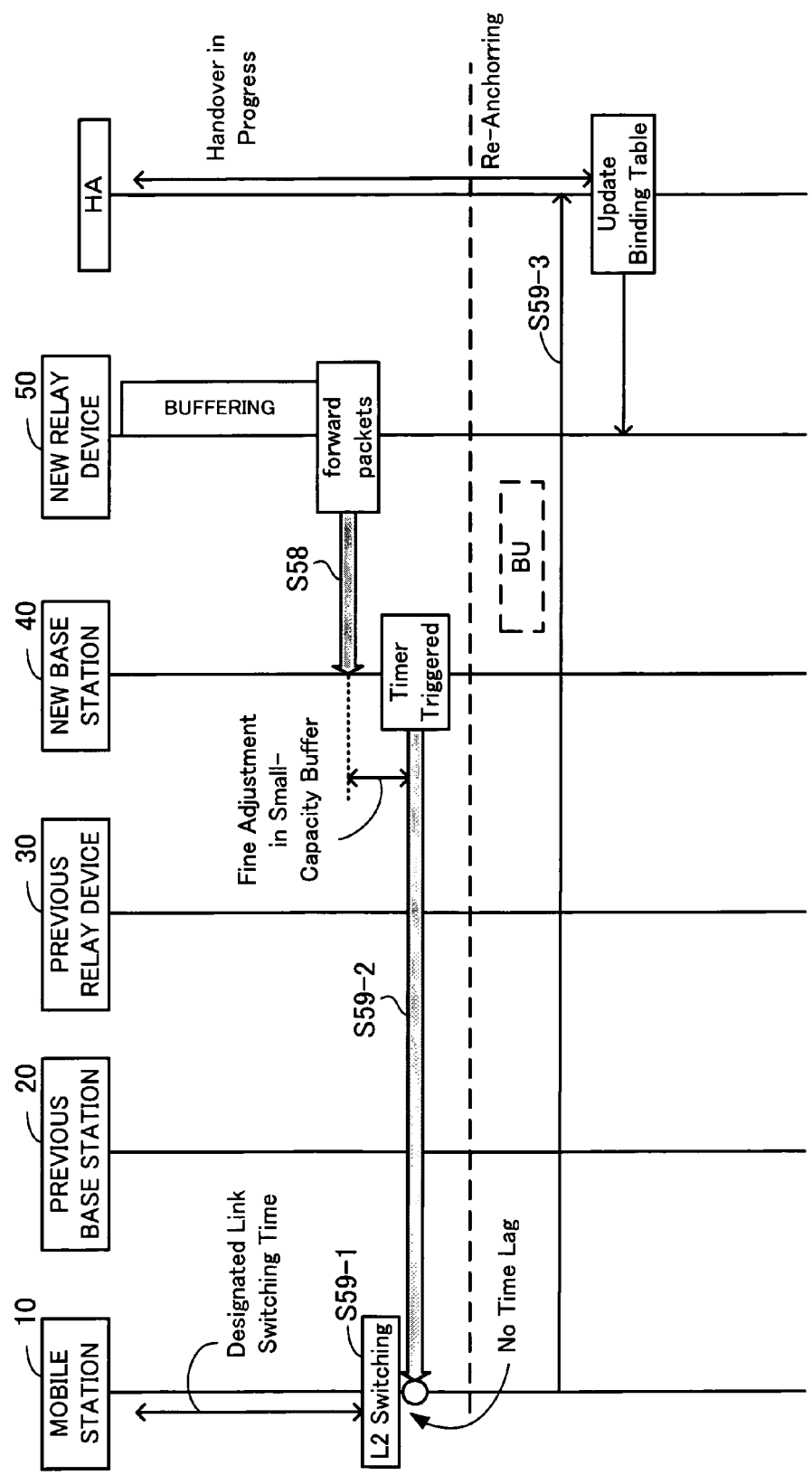
FIG. 10 is a sequence diagram also illustrating the operation according to the fourth embodiment.

A fourth embodiment will be now described with reference to the sequence diagrams of FIGS. 9 and 10 illustrating operation according to the fourth embodiment. Also in the fourth embodiment, Steps S11 to S16 of the first embodiment are executed, and accordingly, the following explanation is directed to the operation corresponding to Step S17 (transfer of packets from the previous relay device 30 to the new relay device 50) and the subsequent operations.

S51: When it is confirmed through the exchange of HI/HAck that the handover to the new relay device 50 is possible, the packet transfer unit 31 of the previous relay device 30 copies each packet addressed to the mobile station 10 and sends (bi-casts) the packet to both of the previous base station 20 and the new relay device 50. At this time, each packet forwarded to both the previous base station 20 and the new relay device 50 is assigned the same sequence number by the previous relay device 30.

The packets transmitted to the previous base station 20 before the start of bi-casting are also assigned respective sequence numbers by the previous relay device 30. The previous relay device 30 stores the sequence number (First bi-casting Packet SN, or for short, F bi-cast SN) of the first bi-cast packet.

S52: The new relay device 50 buffers the received packets.

S53: The previous relay device 30 transmits the First bi-casting Packet SN, along with FBack, to the previous base station 20. The previous base station 20 stores the First bi-casting Packet SN.

S54: A process performed in this step is identical with that executed in Steps S20a and S20c of the first embodiment.

S55: The previous base station 20 transmits, to the new relay device 50, the sequence number (last Ack SN) of the last packet which was acknowledged last by the mobile station 10. The previous base station 20 stops transmitting packets to the mobile station 10 at timing when the message is sent out in Step S55.

S56a: The previous base station 20 determines whether or not the relationship (last Ack SN)<(First bi-casting Packet SN)−1 is fulfilled.

S56b: If it is judged in Step S56a that the inequality holds, the previous base station 20 transmits the packets (remaining packets) remaining therein to the new relay device 50 together with the sequence numbers.

S57: This step is identical with Step S21 of the first embodiment.

S58: The new relay device 50 refers to the sequence numbers assigned to the respective packets and then transmits the packets to the new base station 40 in ascending order of sequence numbers, namely, from the packet with the sequence number (last Ack SN+1). The new relay device 50 discards those packets of which the sequence numbers are smaller than or equal to the last Ack SN.

S59-1 to S59-3: These steps are identical with Steps S23 to S25 of the first embodiment.

Referring now to a specific example, the above operation sequence will be explained. Let us suppose the case where packets with the sequence number #8 and the following numbers (#8, #9, #10, ... ) are bi-cast in Step S51, and when the link between the mobile station 10 and the previous base station 20 is disconnected thereafter, the previous base station 20 holds remaining packets with the sequence numbers #10, #11, ... that failed to be transmitted to the mobile station 10.

In this case, the sequence number (last Ack SN) of the last sent packet which was transmitted last from the previous base station 20 to the mobile station 10 is #9 (since the remaining packet #10 failed to be transmitted to the mobile station 10, the packets up to #9 have been transmitted to the mobile station 10).

The last-sent packet sequence number notifier 25 of the previous base station 20 notifies the packet transmitter 52 of the new relay device 50 that the sequence number of the last sent packet is #9 (Step S55). Also, the remaining packet transmitter 24 determines whether or not the relationship (last Ack SN)<(First bi-cast Packet SN)−1 is fulfilled. In this case, since last Ack SN=#9 and First bi-cast Packet SN=#8, 9>8−1 and thus the inequality (last Ack SN)<(First bi-cast Packet SN)−1 is not fulfilled. Accordingly, no notification is made in Step S56b.

The packet transmitter 52 of the new relay device 50 adds "1" to the sequence number #9 notified in Step S55, and starts to transmit the packets to the mobile station 10 in order from the packet #10. This control prevents duplicate transmission of packets (namely, since the packets with sequence numbers smaller than #10, such as the packets #8 and #9, have already been transmitted from the previous base station 20 to the mobile station 10, the new relay device 50 does not transmit such redundant packets). The redundant packets held by the packet buffer 51 are discarded in the new relay device 50.

Let us suppose another exemplary case where packets with the sequence number #8 and the following numbers (#8, #9, #10, ... ) are bi-cast in Step S51, and when the link between the mobile station 10 and the previous base station 20 is disconnected thereafter, the previous base station 20 holds remaining packets with the sequence numbers #7, #8, #9, #10, ... that failed to be transmitted to the mobile station 10.

The packet #7 is already stored in the previous base station 20 when the bi-casting of packets is started, and remains in the previous base station 20 because of the disconnection of the link.

In this case, the sequence number (last Ack SN) of the last sent packet which was transmitted last from the previous base station 20 to the mobile station 10 is #6 (since the packet #7 and the succeeding packets failed to be transmitted to the mobile station 10, the packets up to #6 have been transmitted to the mobile station 10). Accordingly, the last-sent packet sequence number notifier 25 notifies the packet transmitter 52 of the new relay device 50 that the sequence number of the last sent packet is #6 (Step S55).

Also, the remaining packet transmitter 24 determines whether or not the relationship (last Ack SN)<(First bi-cast Packet SN)−1 is fulfilled. In this case, since last Ack SN=#6 and First bi-cast Packet SN=#8, substituting the values for the relationship (last Ack SN)<(First bi-cast Packet SN)−1 provides 6<8−1 (=7), thus fulfilling the inequality. Accordingly, the remaining packet transmitter 24 transmits the remaining packet, along with its sequence number #7, to the packet buffer 51.

The packet buffer 51 also buffers the remaining packet #7, and the packet transmitter 52 transmits the packets to the mobile station 10 in order from the packet #7. This control prevents the packet #7 from being lost.

As explained above, in the fourth embodiment, the remaining packets are collected and buffered, as in the third embodiment, and in addition, the previous relay device 30 bi-casts packets to allow the new relay device 50 to initiate packet transmission from the packet subsequent to the last Ack SN, whereby the time of short break in the packet transmission/reception can be shortened. Consequently, fast handover is available, as in the first embodiment, and it is also possible to shorten the time of short break in the packet transmission/reception, to prevent the reversal of the order of packets, and to eliminate packet loss.

The following describes the operation of the control message superimposing units 13 and 23.

Each control message superimposing unit superimposes an FBSS control message and a fast handover Mobile IP control message into an identical packet for transmission.

Control messages may be merely superimposed into an identical packet for transmission, but because of the inconveniences described below, the control message superimposing unit superimposes an FBSS control message and a fast handover Mobile IP control message into an identical burst for transmission.

WiMAX adopts an adaptive modulation scheme wherein a single packet is fragmented into units called bursts so that different modulation techniques may be applied to different bursts. The modulation techniques include a high bit rate modulation technique applicable to the case where the mobile and base stations are in good electromagnetic environments, and a low bit rate modulation technique applicable to poor electromagnetic environments. If the high bit rate modulation technique is used in the case where the mobile and base stations are in poor electromagnetic environments, the error probability increases.

Let us suppose the case where, in the first embodiment, an FBSS control message and a fast handover Mobile IP control message are transmitted/received as an identical packet. Even in such cases, if the control messages are transmitted using different bursts, it is possible that one control message is successfully received while the other ends in failure, depending on the receiving environment.

According to the present invention, therefore, the control message superimposing unit extends a WiMAX control message and superimposes the information element of a fast handover Mobile IP control message on the extended part so that the control messages of different layers can be transmitted in the same burst.

Figure 11:
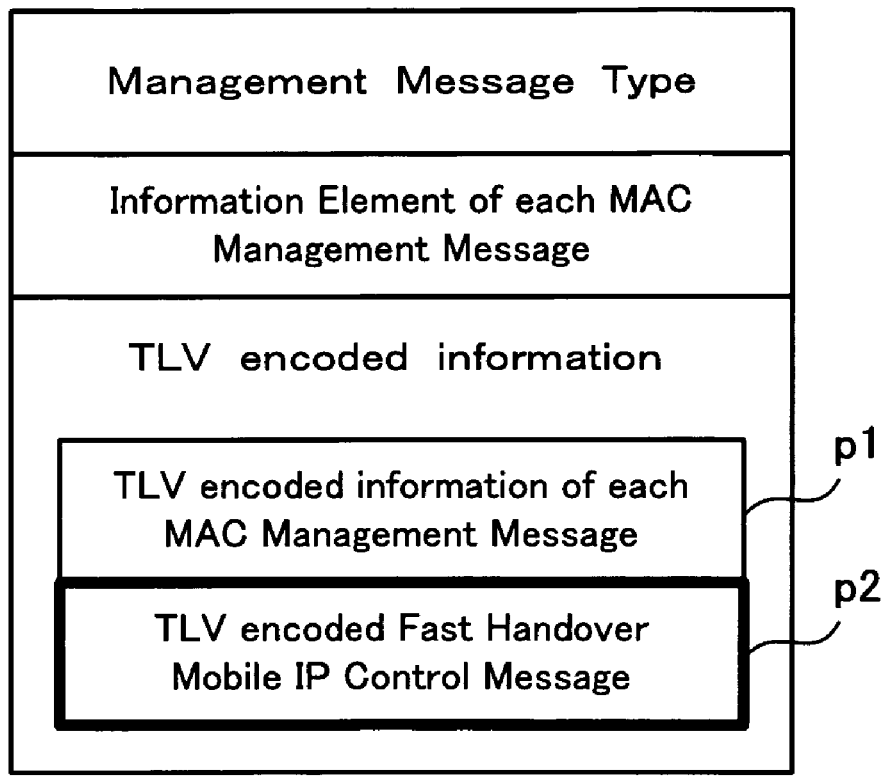
FIG. 11 shows a control message format.
Figure 13:
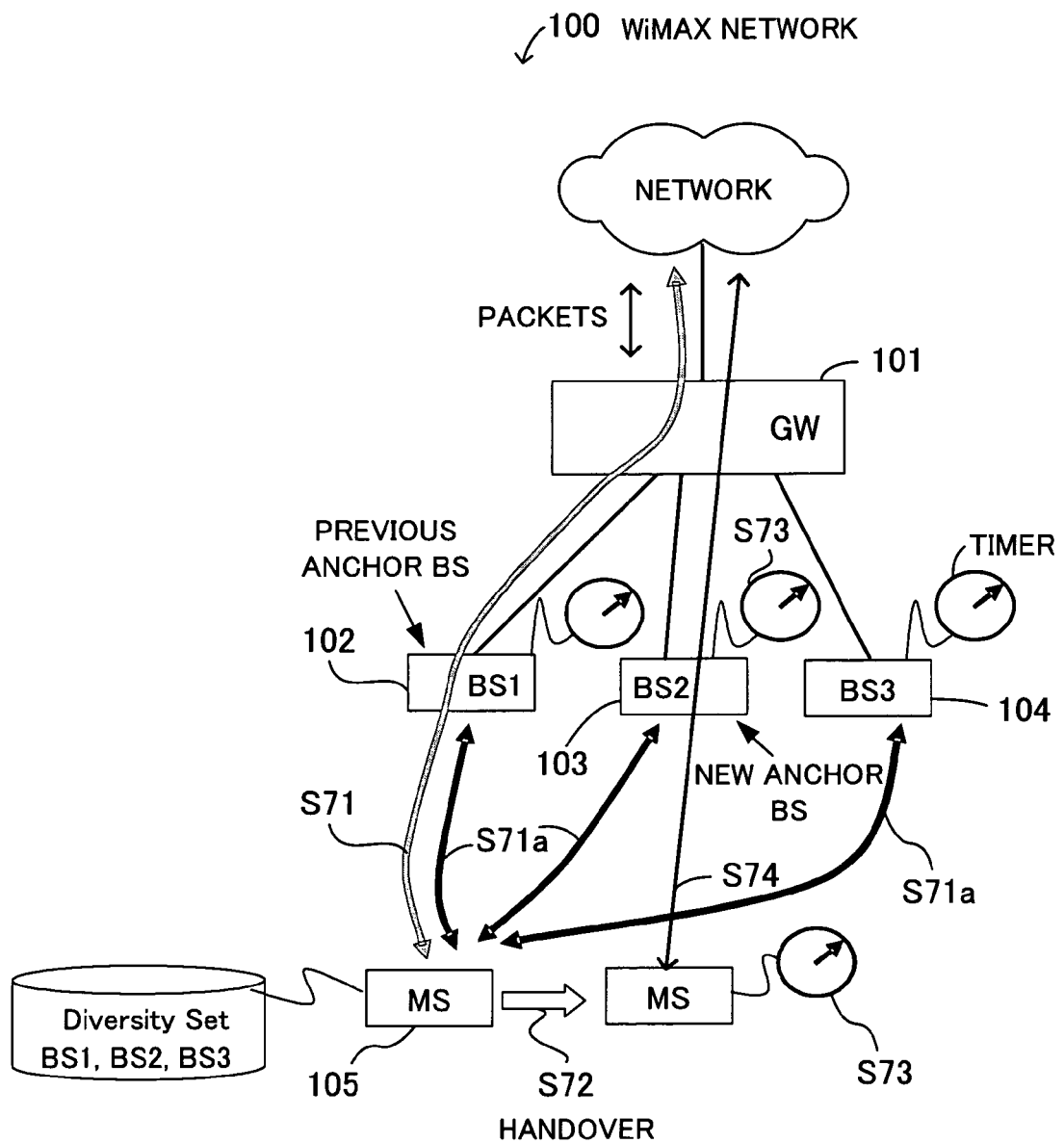
FIG. 13 shows a network wherein handover is carried out according to FBSS.

FIGS. 11 and 12 each illustrate a control message format. MOB_MSHO_REQ+RtSolPr (Step S11a), MOB_BSHO_RSP+PrRtAdv (Step S12) and MOB_HO_IND+FBU (Step S14), explained above with reference to the first embodiment, have a basic format shown in FIG. 11, and Anchor_BS_Switch_IE+FBack (Step S20a), also explained above with reference to the first embodiment, has a basic format shown in FIG. 12.

In FIG. 11, MOB_MSHO_REQ or MOB_BSHO_RSP or MOB_HO_IND is set as Management Message Type, and after the information element of each MAC Management Message is stored, the information element required by each MAC Management Message is subjected to TLV encoding and stored in payload p1. Then, the control message superimposing unit subjects a fast handover Mobile IP control message (RtSolPr, PrRtAdv, FBU) to TLV encoding and stores the encoded message in payload p2 following the payload p1.

As distinct from the message format shown in FIG. 11, Anchor_BS_Switch_IE has the message format shown in FIG. 12. Anchor_BS_Switch_IE originally includes no TLV encoded information. Accordingly, the control message superimposing unit newly adds payload p3 for TLV encoded information, and stores the TLV encoded fast handover Mobile IP control message (FBack) in the payload.

The control message superimposing unit is provided in each of the mobile and base stations, and therefore, when control messages are exchanged between the mobile station and the base station, the number of messages exchanged can be reduced. Also, it is possible to simplify the circuitry incorporated in the mobile and base stations for the control of L2 and L3 messages.

In the wireless communication system of the present invention, the new base station, to which the mobile station is to be newly connected, recognizes the lower layer link switching timing of the mobile station, then adjusts the output timing of the packet transmission initiation message, which triggers packet transmission, so that when packets are transmitted from the new relay device to the mobile station via the new base station, the packets may arrive at the mobile station immediately after the lower layer link switching, and sends out the packet transmission initiation message at the adjusted output timing to the new relay device. On receiving the packet transmission initiation message, the new relay device starts to transmit the packets to the mobile station, thereby eliminating the time difference between the time of completion of the lower layer handover and the time of completion of the upper layer handover. This makes it possible to eliminate the time lag that occurs during the handover process of the conventional system, thus enabling fast handovers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication system for carrying out wireless communication while executing handovers, the wireless communication system comprising:
    a mobile station;
    a previous base station communicating with the mobile station before a handover is executed;
    a new base station to communicate with the mobile station after the execution of the handover;
    a new relay device connected with the new base station, to buffer packets during the handover and relay packets after the execution of the handover; and
    a previous relay device connected with the previous base station, to relay packets before the execution of the handover, wherein:
    the mobile station and the previous base station synchronize link switching timing for a lower layer handover with each other,
    the previous base station notifies the mobile station and the new base station of the link switching timing,
    when notified of the lower layer link switching timing of the mobile station, the new base station adjusts output timing, which is earlier than the lower layer link switching timing, of a packet transmission initiation message, which triggers packet transmission from the packet buffered new relay device, based on a delay between the new base station and the new relay device, so that when a packet is transmitted from the new relay device to the mobile station via the new base station, the packet may arrive at the mobile station immediately after the lower layer link switching, and sends out the packet transmission initiation message at the adjusted output timing to the new relay device,
    when the packet transmission initiation message is received, the new relay device transmits the packet to the mobile station via the new base station, and
    the mobile station executes the lower layer link switching to complete the lower layer handover, and then completes an upper layer handover on receiving the packet from the new relay device immediately after the link switching, to start communication with the new base station while eliminating a time difference between a time of completion of the lower layer handover and a time of completion of the upper layer handover.

2. The wireless communication system according to claim 1, wherein, after completion of a handover preparatory process which is executed among the mobile station, the previous base station and the previous relay device prior to execution of the upper/lower layer handover, the mobile station transmits a handover initiation message to the previous relay device, and the previous relay device transmits packets to the mobile station via the previous base station before the upper/lower layer handover is executed, and, on receiving the handover initiation message, stops transmitting packets to the mobile station and forwards the packets to the new relay device.

3. The wireless communication system according to claim 1, wherein the mobile station and the previous base station each include a control message superimposing unit for generating an upper/lower layer control message by superimposing a lower layer control message, which is necessary for executing the lower layer handover, and an upper layer control message, which is necessary for executing the upper layer handover, to exchange control messages of different layers at a time without separately transmitting/receiving control messages of the different layers.

4. The wireless communication system according to claim 1, wherein the previous base station includes a proxy messenger, the proxy messenger being operative in response to reception of a lower layer control message, which is necessary for executing the lower layer handover, or an upper layer control message, which is necessary for executing the upper layer handover, from the mobile station or the previous relay device, to exchange the upper layer control message with the previous relay device so that the previous base station, in place of the mobile station, can exchange the upper layer control message with the previous relay device.

5. The wireless communication system according to claim 1, wherein:
the new base station includes a send timing fine-adjuster, and
when the packet from the new relay device is to be relayed to the mobile station so as to arrive at the mobile station immediately after the lower layer link switching, the send timing fine-adjuster finely adjusts send timing by delaying a packet transmission time so that the packet may not reach the mobile station before the link switching.

6. A wireless communication system for carrying out wireless communication while executing handovers, the wireless communication system comprising:
a mobile station;
a previous base station communicating with the mobile station before a handover is executed;
a new base station to communicate with the mobile station after the execution of the handover;
a new relay device connected with the new base station, to relay packets after the execution of the handover; and
a previous relay device connected with the previous base station, to relay packets before the execution of the handover, wherein:
the mobile station and the previous base station synchronize link switching timing for a lower layer handover with each other,
the previous base station notifies the mobile station and the new base station of the link switching timing,
when notified of the lower layer link switching timing of the mobile station, the new base station adjusts output timing of a packet transmission initiation message, which triggers packet transmission from the new relay device, so that when a packet is transmitted from the new relay device to the mobile station via the new base station, the packet may arrive at the mobile station immediately after the lower layer link switching, and sends out the packet transmission initiation message at the adjusted output timing to the new relay device,
when the packet transmission initiation message is received, the new relay device transmits the packet to the mobile station via the new base station, and
the mobile station executes the lower layer link switching to complete the lower layer handover, and then completes an upper layer handover on receiving the packet from the new relay device immediately after the link switching, to start communication with the new base station while eliminating a time difference between a time of completion of the lower layer handover and a time of completion of the upper layer handover,
wherein:
the previous base station includes a remaining packet transmitter, and
if, after a handover initiation message is transmitted from the mobile station to the previous relay device via the previous base station, the previous base station holds a remaining packet that failed to be transmitted to the mobile station because of disconnection of a link between the mobile station and the previous base station, the remaining packet transmitter compares a sequence number of a last sent packet which is transmitted last from the previous base station to the mobile station, with a value obtained by subtracting "1" from a sequence number of a buffering start packet which is buffered first in the new relay device, and, if the sequence number of the last sent packet is smaller than the obtained value, transmits the remaining packet to the new relay device to be buffered therein.

7. A wireless communication system for carrying out wireless communication while executing handovers, the wireless communication system comprising:
a mobile station;
a previous base station communicating with the mobile station before a handover is executed;
a new base station to communicate with the mobile station after the execution of the handover;
a new relay device connected with the new base station, to relay packets after the execution of the handover; and
a previous relay device connected with the previous base station, to relay packets before the execution of the handover, wherein:
the mobile station and the previous base station synchronize link switching timing for a lower layer handover with each other,
the previous base station notifies the mobile station and the new base station of the link switching timing,
when notified of the lower layer link switching timing of the mobile station, the new base station adjusts output timing of a packet transmission initiation message, which triggers packet transmission from the new relay device, so that when a packet is transmitted from the new relay device to the mobile station via the new base station, the packet may arrive at the mobile station immediately after the lower layer link switching, and sends out the packet transmission initiation message at the adjusted output timing to the new relay device,
when the packet transmission initiation message is received, the new relay device transmits the packet to the mobile station via the new base station, and
the mobile station executes the lower layer link switching to complete the lower layer handover, and then completes an upper layer handover on receiving the packet from the new relay device immediately after the link switching, to start communication with the new base station while eliminating a time difference between a time of completion of the lower layer handover and a time of completion of the upper layer handover, wherein:

the previous base station includes a last-sent packet sequence number notifier and a remaining packet transmitter, when a handover initiation message is received, the previous relay device transmits packets and sequence numbers assigned thereto to both of the new relay device and the previous base station, the last-sent packet sequence number notifier notifies the new relay device of a sequence number of a last sent packet which is transmitted last from the previous base station to the mobile station, if, while the previous base station is relaying the packets from the previous relay device to the mobile station, a link between the mobile station and the previous base station is disconnected and the previous base station holds a remaining packet that failed to be transmitted to the mobile station, the remaining packet transmitter compares the sequence number of the last sent packet with a value obtained by subtracting "1" from a sequence number of a buffering start packet which is buffered first in the new relay device, and if the sequence number of the last sent packet is not smaller than the obtained value, the new relay device starts to transmit the packets to the mobile station in order from a packet with a sequence number which is equal to a sum of "1" and the sequence number notified from the last-sent packet sequence number notifier.

8. The wireless communication system according to claim 7, wherein:

if the sequence number of the last sent packet is smaller than the obtained value, the remaining packet transmitter transmits, as a remaining packet notification, the remaining packet and a sequence number assigned thereto to the new relay device, and on receiving the remaining packet notification, the new relay device buffers the remaining packet and transmits the packets, inclusive of the remaining packet, to the mobile station.

* * * * *